US012256140B2

(12) United States Patent
Shoda et al.

(10) Patent No.: US 12,256,140 B2
(45) Date of Patent: Mar. 18, 2025

(54) ELECTRONIC APPARATUS, CONTROL METHOD, AND NON-TRANSITORY COMPUTER READABLE MEDIUM

(71) Applicant: CANON KABUSHIKI KAISHA, Tokyo (JP)

(72) Inventors: Ryosuke Shoda, Tokyo (JP); Hiroyuki Kajiyama, Kanagawa (JP); Katsunori Tai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 360 days.

(21) Appl. No.: 17/751,810

(22) Filed: May 24, 2022

(65) Prior Publication Data
US 2022/0385830 A1 Dec. 1, 2022

(30) Foreign Application Priority Data
May 31, 2021 (JP) .................. 2021-091093

(51) Int. Cl.
*H04N 23/63* (2023.01)
*H04N 5/262* (2006.01)
*H04N 13/207* (2018.01)

(52) U.S. Cl.
CPC ......... *H04N 23/635* (2023.01); *H04N 5/2628* (2013.01); *H04N 13/207* (2018.05)

(58) Field of Classification Search
CPC .. H04N 23/635; H04N 5/2628; H04N 13/207; H04N 23/663
See application file for complete search history.

(56) References Cited

FOREIGN PATENT DOCUMENTS

JP 2017017446 A * 1/2017
WO 2011/121840 A1 10/2011

* cited by examiner

*Primary Examiner* — Yogesh K Aggarwal
(74) *Attorney, Agent, or Firm* — Cowan, Liebowitz & Latman, P.C.

(57) ABSTRACT

An electronic apparatus according to the present invention includes: a processor; and a memory storing a program which, when executed by the processor, causes the electronic apparatus to obtain a first live view image corresponding to a first optical image inputted via a first optical system and a second live view image corresponding to a second optical image inputted via a second optical system having a predetermined parallax with respect to the first optical system, and perform control to display, when displaying the first live view image and the second live view image side by side, an indicator indicating a part displayed during playback display in an angle of view of the first optical system such that the indicator is superimposed on the first live view image.

17 Claims, 15 Drawing Sheets

EXTERNAL STORAGE DEVICE

FIG. 7A
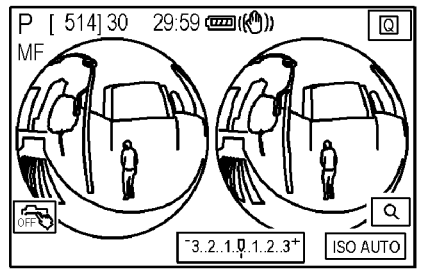
FIG. 7B
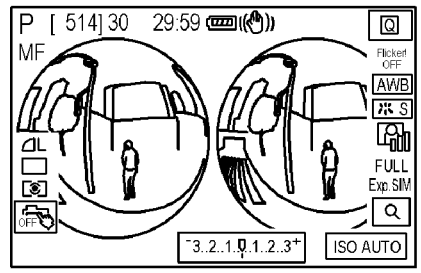
FIG. 7C
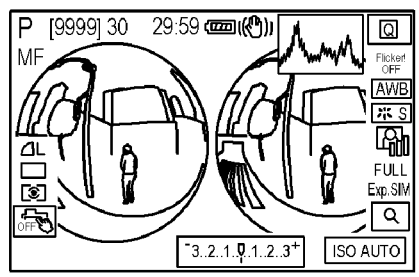
FIG. 7D
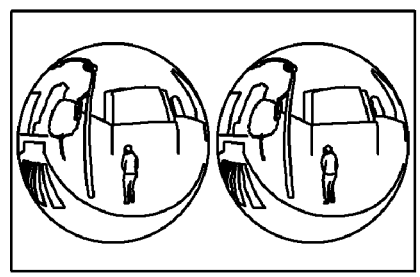
FIG. 7E
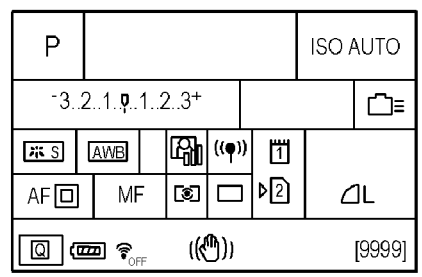
FIG. 7F
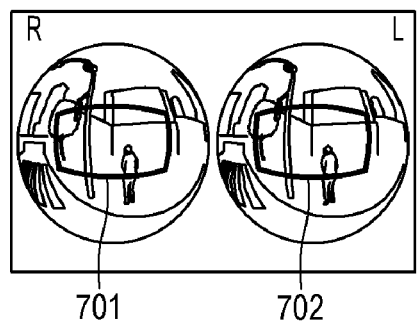
FIG. 7G  INVERSE TRANSFORMATION OF EQUIDISTANT CYLINDER TRANSFORMATION    INVERSE TRANSFORMATION OF PERSPECTIVE PROJECTION TRANSFORMATION
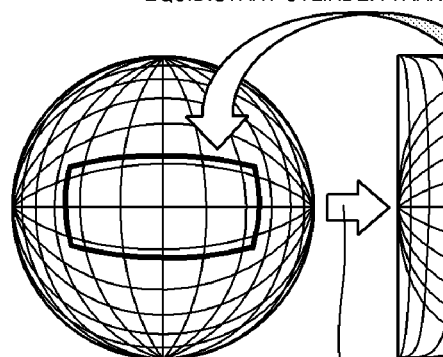
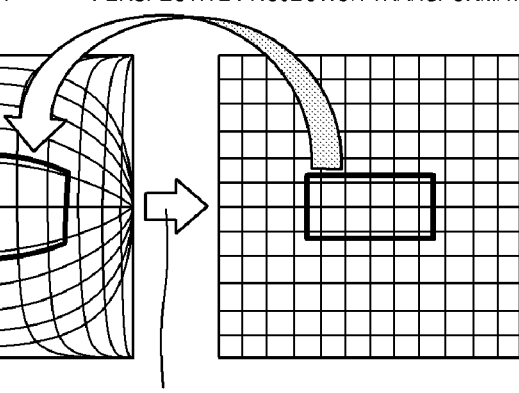
EQUIDISTANT CYLINDER TRANSFORMATION    PERSPECTIVE PROJECTION TRANSFORMATION

FIG. 11A

| LENS DESIGN VALUE |
| --- |
| LENS INDIVIDUAL VALUE |
| LENS FLAG |
| LENS FOCAL LENGTH |
| LENS TEMPERATURE |
| MAGIC WINDOW INFORMATION |

FIG. 11B

| | |
| --- | --- |
| LENS DESIGN VALUE | IMAGE CIRCLE POSITION |
| | IMAGE CIRCLE DIAMETER |
| | ANGLE OF VIEW |
| | DISTORTION CORRECTION COEFFICIENT |
| LENS INDIVIDUAL VALUE | IMAGE CIRCLE DISPLACEMENT |
| | OPTICAL AXIS INCLINATION |
| | IMAGE MAGNIFICATION DEVIATION |

FIG. 11C

| CAMERA RECORDING AREA INFORMATION |
| --- |
| INTRA-CAMERA ACCELEROMETER INFORMATION |
| RIGHT EXPOSURE CORRECTION INFORMATION |

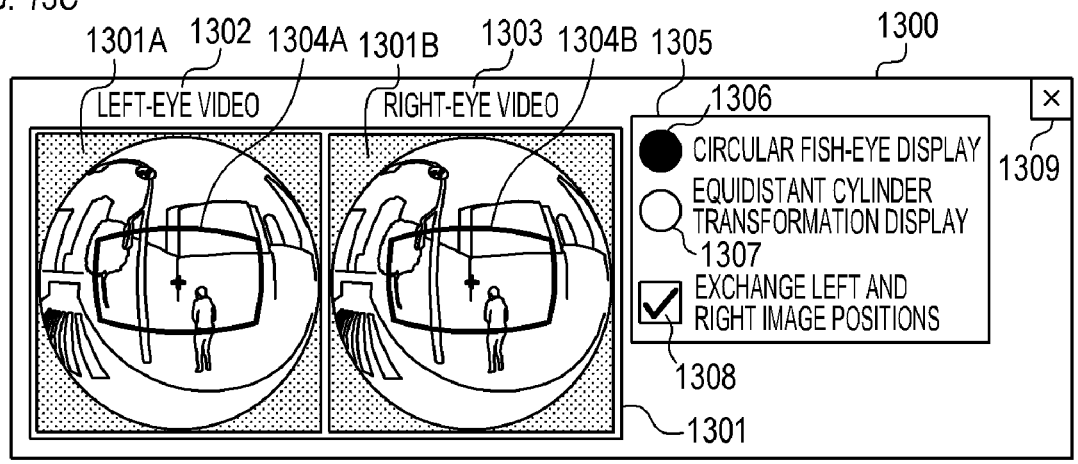
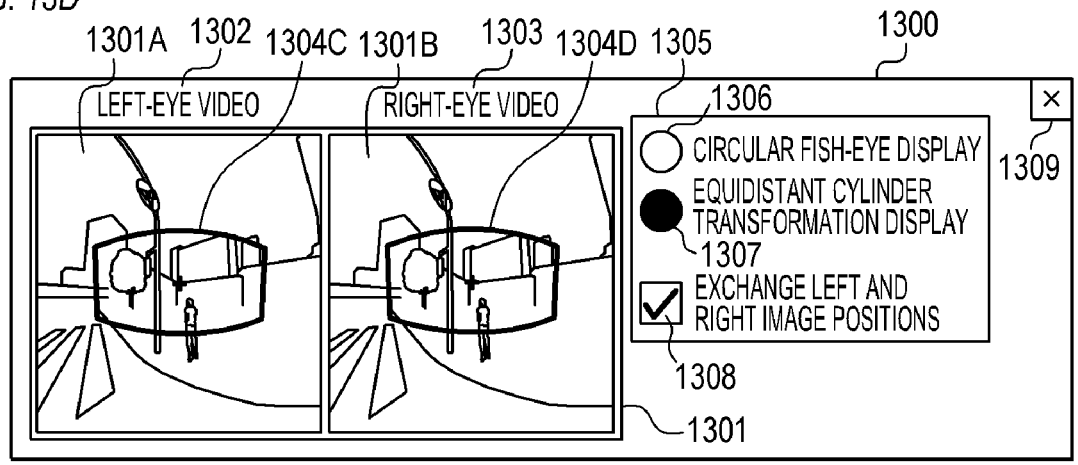

ELECTRONIC APPARATUS, CONTROL METHOD, AND NON-TRANSITORY COMPUTER READABLE MEDIUM

BACKGROUND OF THE INVENTION

Field of the Invention

The present invention relates to an electronic apparatus, a control method, and a non-transitory computer readable medium and particularly relates to a control method for displaying an image having a wide video range (wide view angle).

Description of the Related Art

In known techniques, two images (wide-view-angle images) with a parallax are acquired by using two optical systems and are stereoscopically displayed. A dual-lens camera for capturing two images with a parallax has two optical systems oriented in the same direction, thereby capturing two images with a parallax at a time.

WO 2011/121840 discloses a stereoscopic imaging apparatus that captures the same object from left and right view points by using two imaging units laterally placed with a parallax and acquires a left-eye image and a right-eye image.

Japanese Patent Application Publication No. 2017-17446 discloses an information processing apparatus that displays a frame superimposed on an omnidirectional image when the omnidirectional image captured by a surveillance camera and an image cut from the omnidirectional image are displayed side by side, the frame indicating a part cut from the omnidirectional image.

In this case, it is considered that images captured by a dual-lens camera or the like are entirely displayed during live view display, whereas VR display is provided by using two captured images during playback display. During live view display, a range that can be captured by a dual-lens camera is identifiable but a range to be displayed during playback display cannot be identified.

SUMMARY OF THE INVENTION

The present invention provides a technique by which a range to be displayed during playback display can be identified during live view display.

An electronic apparatus according to the present invention includes: a processor; and a memory storing a program which, when executed by the processor, causes the electronic apparatus to obtain a first live view image corresponding to a first optical image inputted via a first optical system and a second live view image corresponding to a second optical image inputted via a second optical system having a predetermined parallax with respect to the first optical system, and perform control to display, when displaying the first live view image and the second live view image side by side, an indicator indicating a part displayed during playback display in an angle of view of the first optical system such that the indicator is superimposed on the first live view image.

Further features of the present invention will become apparent from the following description of exemplary embodiments with reference to the attached drawings.

BRIEF DESCRIPTION OF THE DRAWINGS

FIGS. 7A to 7G are schematic diagrams of display in various display modes;

FIG. 11A is a schematic diagram indicating lens information, FIG. 11B is a schematic diagram indicating a lens design value and a lens individual value, and FIG. 11C is a schematic diagram indicating camera information;

FIGS. 13A to 13D are schematic diagrams of a display screen; and

DESCRIPTION OF THE EMBODIMENTS

Figure 1A:
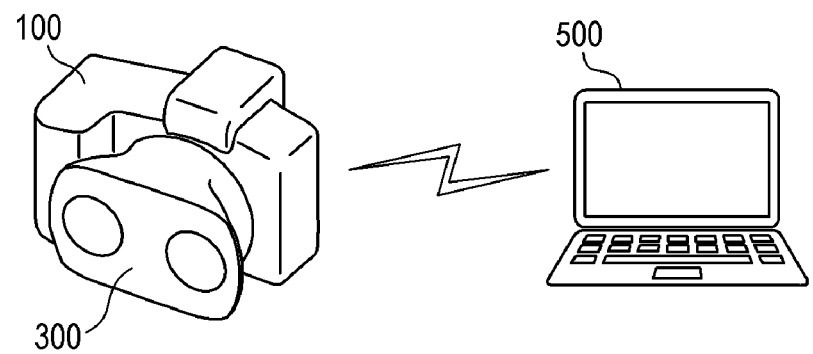
FIGS. 1A and 1B are schematic diagrams illustrating the overall configuration of a system.
Figure 1B:
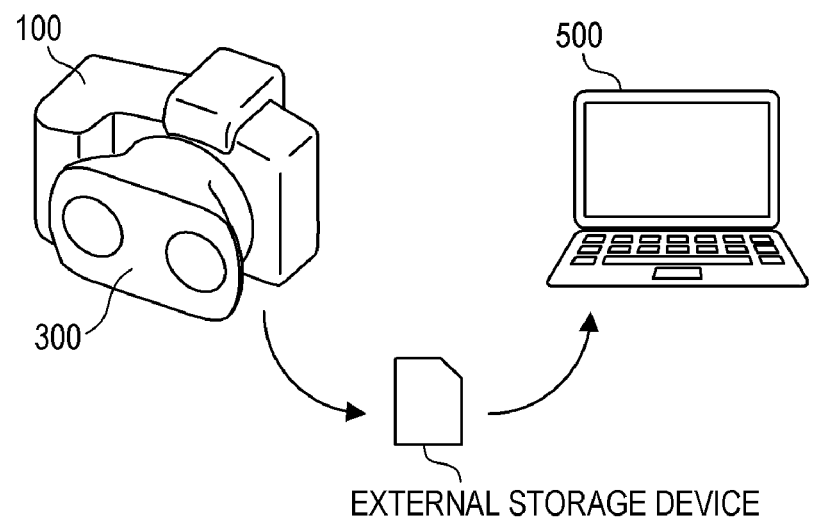

An embodiment of the present invention will be described in detail with reference to the accompanying drawings. FIGS. 1A and 1B are schematic diagrams illustrating an example of the overall configuration of a system according to the present embodiment. The system according to the present embodiment includes a digital camera (camera) 100 and a personal computer (PC) 500. To the camera 100, a lens unit 300 is attached (connected). The lens unit 300 will be specifically described later. The attachment of the lens unit 300 allows the camera 100 to capture two images (still images or moving images) at a time with a predetermined parallax. The PC 500 is an information processing apparatus that handles images captured by imaging apparatuses such as the camera 100. FIG. 1A illustrates a configuration in which the camera 100 and the PC 500 are connected to communicate with each other via radio or wire communications. FIG. 1B illustrates a configuration in which an image or the like captured by the camera 100 is inputted basically as a file to the PC 500 via an external storage device. The external storage device may be connected to or does not need to be connected to both of the camera 100 and the PC 500. For example, the external storage device may be connected to the camera 100, and a file of images captured by the camera 100 may be stored in the external storage device. Thereafter, the external storage device may be detached from the camera 100 and connected to the PC 500, and the file stored in the external storage device may be imported into the PC 500.

Figure 2A:
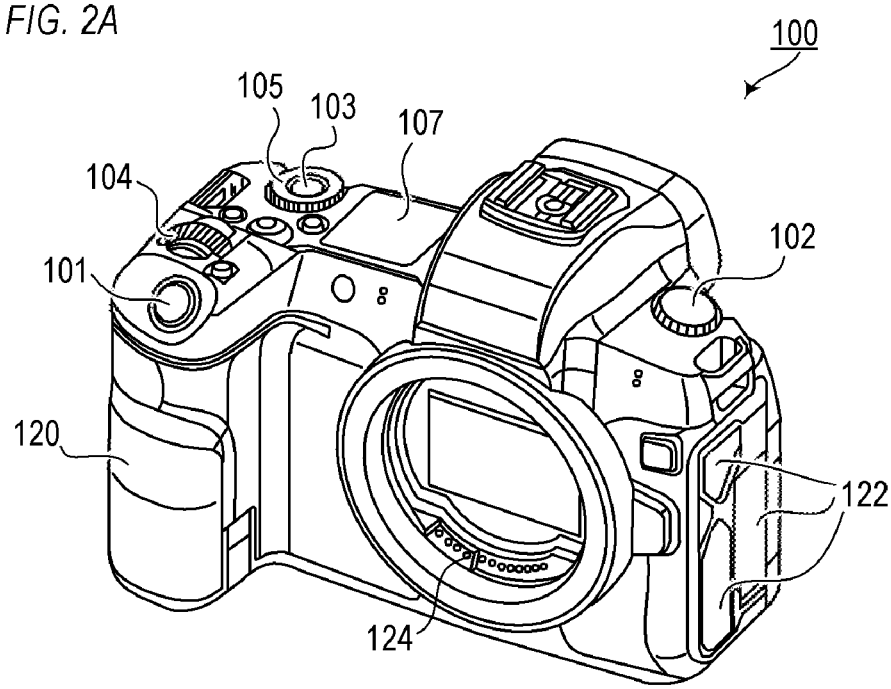
FIGS. 2A and 2B are outside drawings illustrating a camera.
Figure 2B:
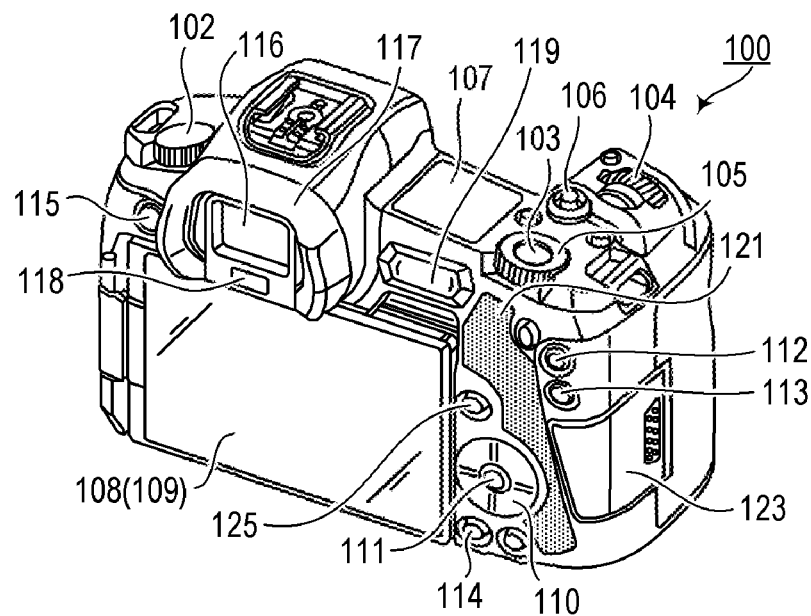

FIGS. 2A and 2B are outside drawings illustrating an example of the appearance of the camera 100. FIG. 2A is a perspective view of the camera 100 viewed from the front side. FIG. 2B is a perspective view of the camera 100 viewed from the back side.

The camera 100 includes, on the top surface, a shutter button 101, a power switch 102, a mode-change switch 103, a main electronic dial 104, a sub electronic dial 105, a moving-image button 106, and a finder-outside display unit 107. The shutter button 101 is an operation member for providing a shooting preparation instruction or a shooting instruction. The power switch 102 is an operation member for turning on or off the power of the camera 100. The mode-change switch 103 is an operation member for switching various modes. The main electronic dial 104 is a rotary operation member for changing set values such as a shutter speed and an aperture. The sub electronic dial 105 is a rotary operation member for moving a selection frame (cursor) or switching images. The moving-image button 106 is an operation member for providing an instruction to start or stop shooting (recording) a moving image. The finder-outside display unit 107 displays various set values such as a shutter speed and an aperture.

The camera 100 includes, on the back side, a display unit 108, a touch panel 109, a direction key 110, a SET button 111, an AE lock button 112, a zoom-in button 113, a playback button 114, and a menu button 115. The camera 100 further includes an eyepiece part 116, an eyepiece detection unit 118, a touch bar 119, and a display-mode switching button 125. The display unit 108 displays images and various information. The touch panel 109 is an operation member for detecting a touch on the display screen (touch screen) of the display unit 108. The direction key 110 is an operation member including a key that can be pressed up and down, left and right (cross key). Processing can be performed according to the pressing position of the direction key 110. The SET button 111 is an operation member to be pressed mainly when a selected item is determined. The AE lock button 112 is an operation member to be pressed when an exposed state is fixed in a shooting standby state. The zoom-in button 113 is an operation member for switching on or off a zoom-in mode in the live view display (LV display) of a shooting mode. When the zoom-in mode is switched on, the main electronic dial 104 is operated so as to zoom in or out a live view image (LV image). The zoom-in button 113 is used when a played back image is enlarged or a magnification is increased in a playback mode. The playback button 114 is an operation member for switching the shooting mode and the playback mode. By pressing the playback button 114 in the shooting mode, the mode shifts to the playback mode, so that the latest one of images recorded in a recording medium 227, which will be described later, can be displayed on the display unit 108.

The menu button 115 is an operation member to be pressed for displaying a menu screen, which enables various settings, on the display unit 108. A user can intuitively make various settings by using the menu screen displayed on the display unit 108, the direction key 110, and the SET button 111. The eyepiece part 116 is a part for looking at an eye level though an eyepiece finder (eye-level finder) 117. The user can visually confirm video displayed on an electronic view finder (EVF) 217, which will be described later, in the camera 100 through the eyepiece part 116. The eyepiece detection unit 118 is a sensor for detecting whether an eye of the user is placed near the eyepiece part 116 (eyepiece finder 117).

The touch bar 119 is a linear touching member (line touch sensor) that can receive a touch. The touch bar 119 is located so as to be touched (touchable) with the right thumb while a grip part 120 is held with the right hand (gripped with the little finger, the ring finger, and the middle finger of the right hand) so as to press the shutter button 101 with the index finger of the right hand. In other words, the touch bar 119 can be operated when the user looks into the eyepiece part 116 with the eyepiece finder 117 placed at eye level and holds the camera in a position (shooting position) that allows the shutter button 101 to be pressed at any time. The touch bar 119 can receive, for example, a tapping operation (touch and release in a predetermined period without moving the touching position) and a sliding operation to the left and right (touch and move the touching position while keeping the touch) on the touch bar 119. The touch bar 119 is an operation member different from the touch panel 109 and does not have a display function. The touch bar 119 acts as, for example, a multi-function bar (M-Fn bar) where various functions can be allocated.

The display-mode switching button 125 is an operation member for switching display modes. A press to the display-mode switching button 125 switches display modes, thereby switching a live view image displayed on the display unit 108 and an OSD image (e.g., a histogram or a level) superimposed on a live view image or the like. The user operates the display-mode switching button 125 and switches the display modes to provide display necessary for a shot of the user.

The camera 100 further includes the grip part 120, a thumb rest part 121, a terminal cover 122, a lid 123, and a communication terminal 124. The grip part 120 is a holding part having a shape that is easy to hold with the right hand of the user who holds the camera 100. While the camera 100 is held with the grip part 120 gripped with the little finger, the ring finger, and the middle finger of the right hand, the shutter button 101 and the main electronic dial 104 are located so as to be operated with the right index finger. In the same state, the sub electronic dial 105 and the touch bar 119 are located so as to be operated with the right index finger. The thumb rest part 121 (thumb standby position) is a grip part provided at a point where the right thumb holding the grip part 120 is easily placed without operating any of the operation members on the back side of the camera 100. The thumb rest part 121 includes a rubber member for increasing holding power (a sense of gripping). The terminal cover 122 protects a connector, e.g., a connection cable that connects the camera 100 to external equipment (external device). The lid 123 closes a slot for storing the recording medium 227, which will be described later, so that the recording medium 227 and the slot are protected. The communication terminal 124 is a terminal for communicating with a lens unit (e.g., a lens unit 200 or the lens unit 300, which will be described later) detachable from the camera 100.

Figure 3:
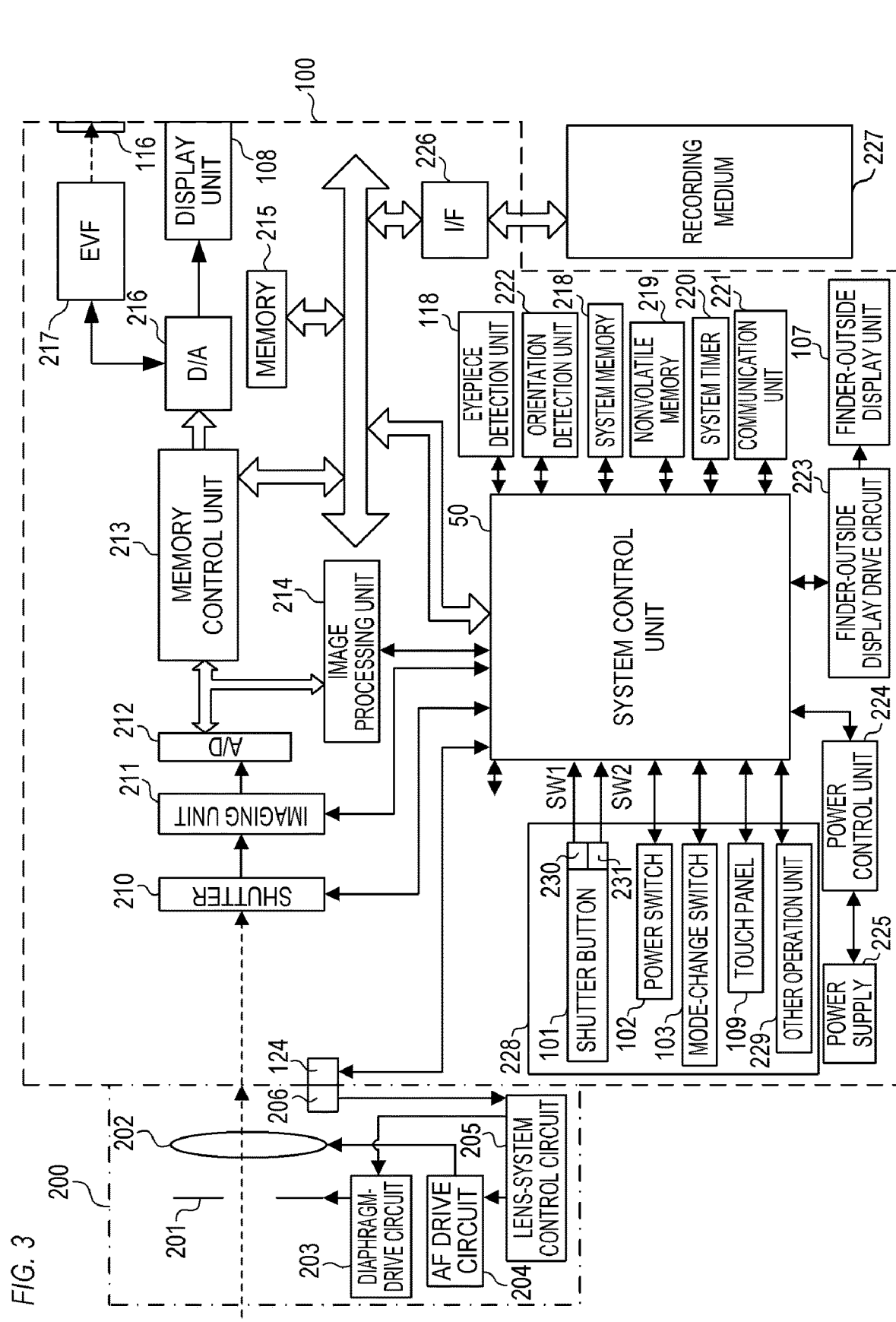
FIG. 3 is a block diagram illustrating the configuration of the camera.

FIG. 3 is a block diagram illustrating an example of the configuration of the camera 100. The same constituent elements as those of FIGS. 2A and 2B are indicated by the same reference numerals as in FIGS. 2A and 2B, and an explanation thereof is optionally omitted. In FIG. 3, the lens unit 200 is attached to the camera 100.

The lens unit 200 will be first described below. The lens unit 200 is a kind of interchangeable lens detachable from the camera 100. The lens unit 200 is a single lens, an example of a typical lens. The lens unit 200 includes a diaphragm 201, a lens 202, a diaphragm-drive circuit 203, an autofocus (AF) drive circuit 204, a lens-system control circuit 205, and a communication terminal 206.

The diaphragm 201 is configured with an adjustable aperture diameter. The lens 202 includes a plurality of lenses. The diaphragm-drive circuit 203 adjusts an amount of light by controlling the aperture diameter of the diaphragm 201. The AF drive circuit 204 adjusts the focus by driving the lens 202. The lens-system control circuit 205 controls the diaphragm-drive circuit 203 and the AF drive circuit 204 based on an instruction of a system control unit 50, which will be described later. The lens-system control circuit 205 controls the diaphragm 201 via the diaphragm-drive circuit 203 and adjusts the focus by changing the position of the lens 202 via the AF drive circuit 204. The lens-system control circuit 205 can communicate with the camera 100. Specifically, the communications are conducted through the communication terminal 206 of the lens unit 200 and the communication terminal 124 of the camera 100. The communication terminal 206 is a terminal that allows the lens unit 200 to communicate with the camera 100.

The camera 100 will be described below. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal-plane shutter capable of freely controlling the exposure time of the imaging unit 211 based on an instruction of the system control unit 50. The imaging unit 211 is an image pickup device (image sensor) including a CCD and a CMOS device that convert an optical image into an electric signal. The imaging unit 211 may include an imaging-area phase-difference sensor for outputting defocus-amount information to the system control unit 50. The A/D converter 212 converts an analog signal, which is outputted from the imaging unit 211, into a digital signal. The image processing unit 214 performs predetermined processing (including pixel interpolation, resizing such as size reduction, and color conversion) on data from the A/D converter 212 or data from the memory control unit 213. Moreover, the image processing unit 214 performs predetermined arithmetic processing by using captured image data, and then the system control unit 50 performs exposure control and distance-measurement control based on the obtained processing result. This processing enables, for example, through-the-lens (TTL) AF processing, autoexposure (AE) processing, flash pre-emission (EF) processing. Furthermore, the image processing unit 214 performs the predetermined arithmetic processing by using the captured image data, and then the system control unit 50 performs TTL auto white balance (AWB) processing based on the obtained processing result.

Image data from the A/D converter 212 is written into the memory 215 through the image processing unit 214 and the memory control unit 213. Alternatively, image data from the A/D converter 212 is written into the memory 215 through the memory control unit 213 without the image processing unit 214. The memory 215 stores image data that is obtained by the imaging unit 211 and is converted into digital data by the A/D converter 212 and image data to be displayed on the display unit 108 and the EVF 217. The memory 215 has a storage capacity that is large enough to store a predetermined number of still images and moving images and voice in a predetermined time. Moreover, the memory 215 acts as an image display memory (video memory).

The D/A converter 216 converts image data, which is to be displayed and is stored in the memory 215, into an analog signal and supplies the signal to the display unit 108 and the EVF 217. Thus, the image data that is to be displayed and is written into the memory 215 is displayed on the display unit 108 and the EVF 217 via the D/A converter 216. The display unit 108 and the EVF 217 provide display in response to the analog signal from the D/A converter 216. The display unit 108 and the EVF 217 are, for example, LCDs or organic EL displays. Digital signals that are converted by the A/D converter 212 and are stored in the memory 215 are converted into analog signals by the D/A converter 216, are sequentially transferred to the display unit 108 and the EVF 217, and are displayed thereon, thereby providing live view display.

The system control unit 50 is a control unit including at least one processor and/or at least one circuit. In other words, the system control unit 50 may be a processor, a circuit, or a combination of a processor and a circuit. The system control unit 50 controls the overall camera 100. The system control unit 50 implements the processing of flowcharts, which will be described later, by running programs recorded in a nonvolatile memory 219. Moreover, the system control unit 50 performs display control by controlling, for example, the memory 215, the D/A converter 216, the display unit 108, and the EVF 217.

The camera 100 further includes a system memory 218, the nonvolatile memory 219, a system timer 220, a communication unit 221, an orientation detection unit 222, and the eyepiece detection unit 118.

The system memory 218 is, for example, RAM. In the system memory 218, constants and variables for the operations of the system control unit 50 and programs or the like read from the nonvolatile memory 219 are expanded. The nonvolatile memory 219 is electrically erasable and recordable memory. The nonvolatile memory 219 is, for example, an EEPROM. In the nonvolatile memory 219, constants and programs or the like for the operations of the system control unit 50 are recorded. In this case, the programs are programs for implementing the flowcharts, which will be described later. The system timer 220 is a timer unit for measuring a time used for various kinds of control and the time of a built-in clock. The communication unit 221 transmits and receives a video signal and an audio signal to and from external equipment connected wirelessly or via a wired cable. The communication unit 221 can be also connected to a wireless local area network (LAN) and the Internet. Moreover, the communication unit 221 can communicate with external equipment also via Bluetooth (registered trademark) and Bluetooth Low Energy. The communication unit 221 can transmit images (including a live image) captured by the imaging unit 211 and images recorded in the recording medium 227 and receive images and other various kinds of information from the external equipment. The orientation detection unit 222 detects the orientation of the camera 100 with respect to the direction of gravity. Based on the orientation detected by the orientation detection unit 222, it can be determined whether an image has been captured by the imaging unit 211 with the camera 100 in a horizontal position or in a vertical position. The system control unit 50 can add orientation information, which corresponds to the orientation detected by the orientation detection unit 222, to the image file of the image captured by the imaging unit 211 or rotate the image according to the detected orientation. The orientation detection unit 222 may be, for example, an acceleration sensor or a gyro sensor. A motion (e.g., pan, tilt, lift, stationary or not) of the camera 100 can be also detected by using the orientation detection unit 222.

The eyepiece detection unit 118 can detect an object approaching the eyepiece part 116 (eyepiece finder 117). The eyepiece detection unit 118 may be, for example, an infrared proximity sensor. When an object approaches the eyepiece part 116, infrared radiation from the light-emitting part of the eyepiece detection unit 118 is reflected by the object and is received by the light-receiving part of the infrared proximity sensor. A distance from the eyepiece part 116 to the object can be determined according to the amount of received infrared radiation. In this way, the eyepiece detection unit 118 performs approach detection for detecting a distance of approach from the object to the eyepiece part 116. The eyepiece detection unit 118 is an eyepiece detection sensor for detecting an eye (object) moving close to (approaching) and moving away from (separating from) the eyepiece part 116. If an object approaching the eyepiece part 116 in a predetermined distance is detected from a non-approaching state (a moving-away state), the approach of the object is detected. If the object moves away from the eyepiece part 116 for the predetermined distance or more from an approaching state (a moving-close state), the separation of the object is detected. Different threshold values may be used for detecting the approach of an object and detecting the separation of the object with, for example, a hysteresis. Moreover, it is assumed that after the approach of an object is detected, an approaching state continues until the separation of the object is detected. It is assumed that after the separation of the object is detected, a non-approaching state continues until an approach of the object is detected. The system control unit 50 switches show (displayed state)/hide (hidden state) of the display unit 108 and the EVF 217 according to a state detected by the eyepiece detection unit 118. Specifically, at least in a shooting standby state and automatic switching as a switching setting on the display, the display unit 108 is shown and the EVF 217 is hidden during a non-approaching state. During an approaching state, the EVF 217 is shown and the display unit 108 is hidden. The eyepiece detection unit 118 is not limited to an infrared proximity sensor. The eyepiece detection unit 118 may be other sensors capable of detecting an approach.

The camera 100 further includes the finder-outside display unit 107, a finder-outside display drive circuit 223, a power control unit 224, a power supply 225, a recording medium I/F 226, and an operation unit 228.

The finder-outside display unit 107 is driven by the finder-outside display drive circuit 223 and displays various set values of the camera 100, for example, a shutter speed and an aperture. The power control unit 224 includes a battery detection circuit, a DC-DC converter, and a switch circuit for switching blocks to be energized. The power control unit 224 detects, for example, the presence or absence of a battery, a battery type, and a remaining battery capacity. Moreover, the power control unit 224 controls the DC-DC converter based on the detection result and an instruction from the system control unit 50 and supplies a required voltage to parts including the recording medium 227 for a necessary period. The power supply 225 includes primary batteries such as an alkaline battery and a lithium battery, secondary batteries such as a NiCd battery, an NiMH battery, and a Li battery, and an AC adapter. The recording medium I/F 226 is an interface to the recording medium 227, e.g., a memory card or a hard disk. The recording medium 227 is, for example, a memory card for recording captured images and includes a semiconductor memory and a magnetic disk. The recording medium 227 may be detachable from the camera 100 or may be built into the camera 100.

The operation unit 228 is an input unit for receiving an operation from the user (user operation). The operation unit 228 is used for inputting various instructions to the system control unit 50. The operation unit 228 includes the shutter button 101, the power switch 102, the mode-change switch 103, the touch panel 109, and other operation units 229. The other operation units 229 include the main electronic dial 104, the sub electronic dial 105, the moving-image button 106, the direction key 110, the SET button 111, and the AE lock button 112. Furthermore, the other operation units 229 include the zoom-in button 113, the playback button 114, the menu button 115, the touch bar 119, and the display-mode switching button 125.

The shutter button 101 includes a first shutter switch 230 and a second shutter switch 231. The first shutter switch 230 is turned on to output a first shutter-switch signal SW1 during an operation of the shutter button 101, that is, a half press (shooting preparation instruction) of the shutter button 101. The system control unit 50 starts shooting preparation including AF processing, AE processing, AWB processing, and EF processing in response to the first shutter-switch signal SW1. The second shutter switch 231 is turned on to output a second shutter-switch signal SW2 at the completion of an operation of the shutter button 101, that is, a full press (shooting instruction) of the shutter button 101. In response to the second shutter-switch signal SW2, the system control unit 50 starts a sequence of photo shooting from the reading of a signal from the imaging unit 211 to the writing of a generated image file, which includes captured images, into the recording medium 227.

The mode-change switch 103 switches the operation mode of the system control unit 50 to any one of a still-image shooting mode, a moving-image shooting mode, and a playback mode. The still-image shooting mode includes modes such as an auto shooting mode, an auto scene-determination mode, a manual mode, an aperture-priority mode (Av mode), a shutter-speed priority mode (Tv mode), and a program AE mode (P mode). Moreover, various scene modes serving as shooting settings for respective shooting scenes and custom modes are included. The user can directly switch to any one of the shooting modes by the mode-change switch 103. Alternatively, after switching to a list screen of the shooting modes by the mode-change switch 103, the user can selectively switch to any one of the displayed shooting modes by the operation unit 228. Likewise, the moving-image shooting mode may include multiple modes.

The touch panel 109 is a touch sensor for detecting various touching operations on the display screen of the display unit 108 (the operation screen of the touch panel 109). The touch panel 109 and the display unit 108 can be integrated into a single unit. For example, the touch panel 109 is attached to the upper layer of the display screen of the display unit 108 such that the light transmittance does not interfere with the display of the display unit 108. Furthermore, input coordinates on the touch panel 109 and display coordinates on the display screen of the display unit 108 are associated with each other, thereby configuring a graphical user interface (GUI) such that the user can directly operate a screen displayed on the display unit 108. The touch panel 109 may be any one of various types including a resistive type, a capacitive type, a surface acoustic wave type, an infrared type, an electromagnetic induction type, an image recognition type, and a photosensor type. A touch is detected when the touch panel 109 is touched or when a finger or a pen is brought close to the touch panel 109, depending upon the type of the touch panel 109. In any case, any type of touch panel may be used.

For the touch panel 109, the system control unit 50 can detect the following operations or states:

A first touch of a finger or a pen on the touch panel 109, that is, the start of a touch (hereinafter referred to as touch-down)

A touch on the touch panel 109 with a finger or a pen (hereinafter referred to as touch-on)

A finger or a pen moving in contact with the touch panel 109 (hereinafter referred to as touch-move)

A finger or a pen moving away (released) from the touch panel 109, that is, the end of a touch (hereinafter referred to as touch-up)

Nothing in contact with the touch panel 109 (hereinafter referred to as touch-off)

When touch-down is detected, touch-on is also detected at the same time. After touch-down, touch-on is continuously detected unless touch-up is detected. Also when touch-move is detected, touch-on is detected at the same time. Even if touch-on is detected, touch-move is undetected as long as the touch position is not moved. After the touch-up of all fingers or a pen from the touch panel 109 is detected, touch-off is determined.

These operations and states and the position coordinates of a finger or a pen on the touch panel 109 are notified to the system control unit 50 through an internal bus. The system control unit 50 determines an operation (touch) on the touch panel 109 based on the notified information. In touch-move, the moving direction of a finger or a pen on the touch panel 109 can be also determined for each vertical component and horizontal component on the touch panel 109 based on a change of the position coordinates. When touch-move for a predetermined distance or more is detected, it is determined that a sliding operation has been performed. A flick is to quickly move a finger for a certain distance on the touch panel 109 and release the finger from the touch panel 109. In other words, a flick is to quickly move a finger with a light sharp contact on the touch panel 109. When touch-move at a predetermined speed or higher for a predetermined distance or more is detected and then touch-up is detected, it is determined that a flick has been performed (it can be determined that a flick has been performed subsequently to a sliding operation). Furthermore, to pinch in is to bring touching positions at multiple points (multi-touch at, e.g., two points) close to each other, whereas to pinch out is to move the touching positions apart from each other. To pinch out and to pinch are collectively called a pinching operation (or simply referred to as a pinch).

Figure 4:
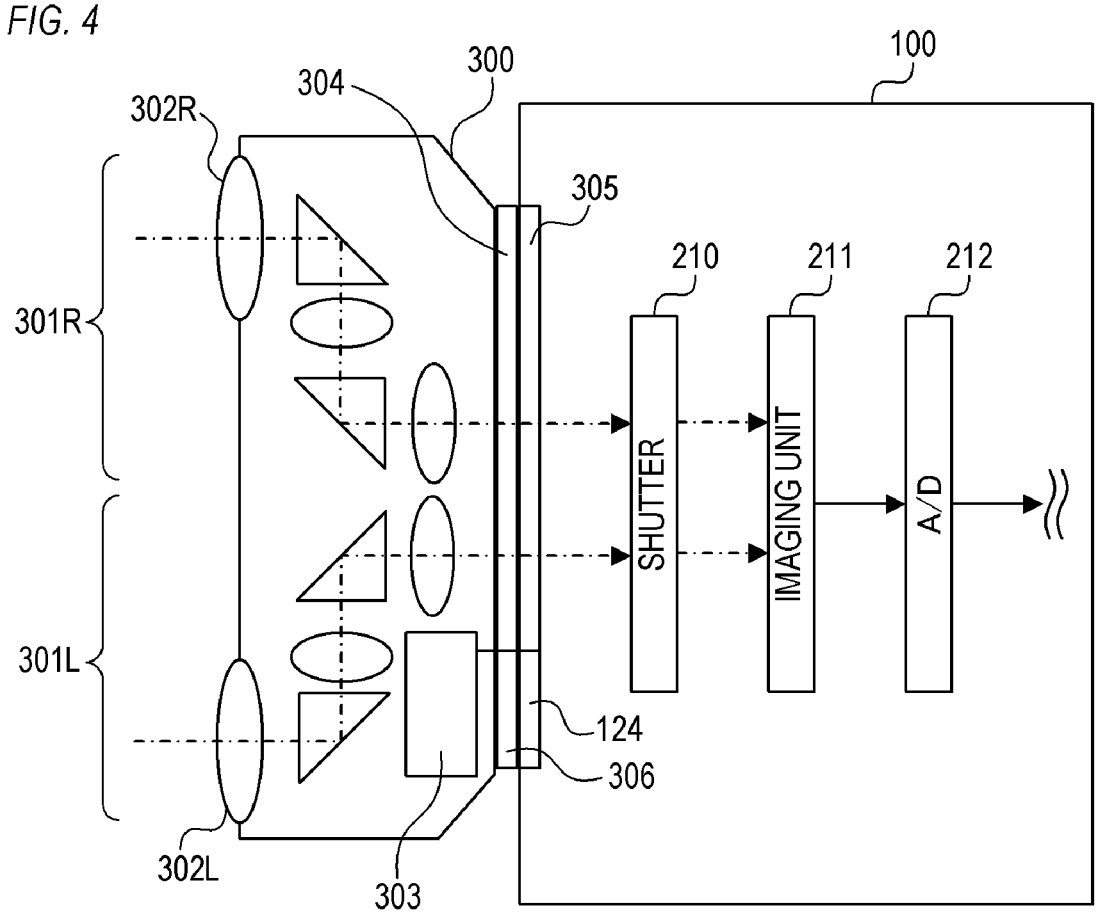
FIG. 4 is a schematic diagram illustrating the configuration of a lens unit.

FIG. 4 is a schematic diagram illustrating an example of the configuration of the lens unit 300. In FIG. 4, the lens unit 300 is attached to the camera 100. In the camera 100 illustrated in FIG. 4, the same constituent elements as those of FIG. 3 are indicated by the same reference numerals as in FIG. 3, and an explanation thereof is optionally omitted.

The lens unit 300 is a kind of interchangeable lens detachable from the camera 100. The lens unit 300 is a dual-lens unit that can capture a right image and a left image with a parallax. In the present embodiment, the lens unit 300 includes two optical systems. Each of the optical systems can capture the range of a wide view angle of about 180°. Specifically, each of the two optical systems of the lens unit 300 can capture an object over a field of view (an angle of view) of 180° in the horizontal direction (horizontal angle, azimuth angle, yaw angle) and 180° in the vertical direction (vertical angle, altitude angle, pitch angle). In other words, each of the optical systems can capture the range of a front hemisphere.

The lens unit 300 includes a right-eye optical system 301R having a plurality of lenses and reflection mirrors, a left-eye optical system 301L having a plurality of lenses and reflection mirrors, and a lens-system control circuit 303. The right-eye optical system 301R is an example of a first optical system. The left-eye optical system 301L is an example of a second optical system. The right-eye optical system 301R has a lens 302R disposed near the object. The left-eye optical system 301L has a lens 302L disposed near the object. The lens 302R and the lens 302L are oriented in the same direction with the optical axes substantially parallel to each other.

The lens unit 300 is a dual-lens unit (VR180 lens) for obtaining an image of VR180, a format of a virtual reality (VR) image that can be viewed in binocular vision. In the present embodiment, the lens unit 300 has a fish-eye lens in each of the right-eye optical system 301R and the left-eye optical system 301L, the fish-eye lens being capable of capturing the range of about 180°. The lens in each of the right-eye optical system 301R and the left-eye optical system 301L may capture a range of about 160° smaller than the range of 180°. The lens unit 300 can form a right image (first image) and a left image (second image) on one or two image pickup devices of the camera with the lens unit 300 attached to the camera. The right image is formed through the right-eye optical system 301R, and the left image is formed through the left-eye optical system 301L.

The lens unit 300 is attached to the camera 100 via a lens mount part 304 and a camera mount part 305 of the camera 100. With this configuration, the system control unit 50 of the camera 100 and the lens-system control circuit 303 of the lens unit 300 are electrically connected to each other via the communication terminal 124 of the camera 100 and a communication terminal 306 of the lens unit 300.

In the present embodiment, a right image formed through the right-eye optical system 301R and a left image formed through the left-eye optical system 301L are formed at the same time (as a set) in the imaging unit 211 of the camera 100. In other words, two optical images formed through the right-eye optical system 301R and the left-eye optical system 301L are formed on one image pickup device. The imaging unit 211 converts a formed object image (optical signal) into an analog electric signal. By using the lens unit 300, two images with a parallax can be obtained at the same time (as a set) from two points (optical systems) on the right-eye optical system 301R and the left-eye optical system 301L. VR display is provided for each of the left-eye image and the right-eye image of the obtained images, enabling the user to view a three-dimensional VR image over the range of about 180°. In other words, the user can obtain a stereoscopic view of an image of VR180.

In this case, a VR image is an image viewable in VR display, which will be described later. VR images include an omnidirectional image (whole-celestial spherical image) captured by an omnidirectional camera (whole-celestial sphere camera) and a panoramic image having a video range (effective video range) larger than a display range that can be displayed at a time on the display part. Moreover, VR images include a moving image and a live image (an image obtained substantially in real time from a camera) as well as a still image. A VR image has a maximum video range (effective video range) corresponding to a field of view over 360° in the horizontal direction and 360° in the vertical direction. VR images also include an image having an angle of view larger than an angle of view that can be captured by an ordinary camera or a video range larger than a display range that can be displayed at a time on the display part, even if the video range is smaller than 360° in the horizontal direction and 360° in the vertical direction. An image captured by the camera 100 with the lens unit 300 is a kind of VR image. A VR image can be viewed in VR display by setting, for example, the display mode of a display device (a display device capable of displaying a VR image) at "VR view." A VR image having a 360-degree angle of view is viewed in VR display; meanwhile, the user changes the orientation of the display device in the lateral direction (horizontal rotation direction), so that omnidirectional video can be seamlessly viewed in the horizontal direction.

VR display (VR view) is a display method (display mode) for displaying, from among VR images, video in a field of view corresponding to the orientation of the display device, the display method being capable of changing a display range. VR display includes "single-lens VR display (single-lens VR view)" in which an image is displayed after deformation (distortion correction) for mapping a VR image on a virtual sphere. Single-lens VR display is provided, for example, when a moving image of VR180 is played back and displayed on a PC. VR display includes "dual-lens VR display (dual-lens VR view)" in which a left-eye VR image and a right-eye VR image are displayed in left and right areas after deformation (distortion correction) for mapping the VR images on a virtual sphere. Dual-lens VR display is provided, for example, when a moving image of VR180 is played back and displayed on a head-mounted display (HMD). "Dual-lens VR display" is provided using a left-eye VR image and a right-eye VR image with a parallax, achieving a stereoscopic view of the VR images. In any type of VR display, for example, if the user wears a display device, e.g., an HMD, video is displayed in a field of view corresponding to the orientation of a user's face. For example, it is assumed that from among VR images, video is displayed in a field of view having its center at 0° (a specific cardinal point, e.g., the north) in the horizontal direction and 90° (90° from the zenith, that is, the horizon) in the vertical direction at a certain point in time. In this state, the orientation of the display device is flipped (for example, the display screen is changed from a southern aspect to a northern aspect), so that from among the same VR images, the display range is changed to video in a field of view having its center at 180° (an opposite cardinal point, e.g., the south) in the horizontal direction and 90° in the vertical direction. In other words, when the face of the user with the HMD is turned from the north to the south (that is, the user turns around), video displayed on the HMD is changed from the north to the south. A VR image captured by the lens unit 300 of the present embodiment is an image captured in a forward range of about 180° (180-degree image). Video in a backward range of about 180° is not present. In the VR display of such an image, when the orientation of the display device is changed to a side where video is absent, a blank area is displayed.

Such VR display of a VR image makes the user feel like staying in the VR image (VR space) in a visual form (sense of immersion). The display method of a VR image is not limited to a method for changing the orientation of the display device. For example, the display range may be moved (scrolled) in response to a user operation via a touch panel or a directional button or the like. Moreover, in VR display (display mode "VR view"), the display range may be changed in response to touch-move on a touch panel, a drag operation with a mouse or the like, or a press to a directional button in addition to a change of the display range by a change of the orientation. A smartphone attached to a VR goggle (head-mounted adapter) is a kind of HMD.

Figure 5:
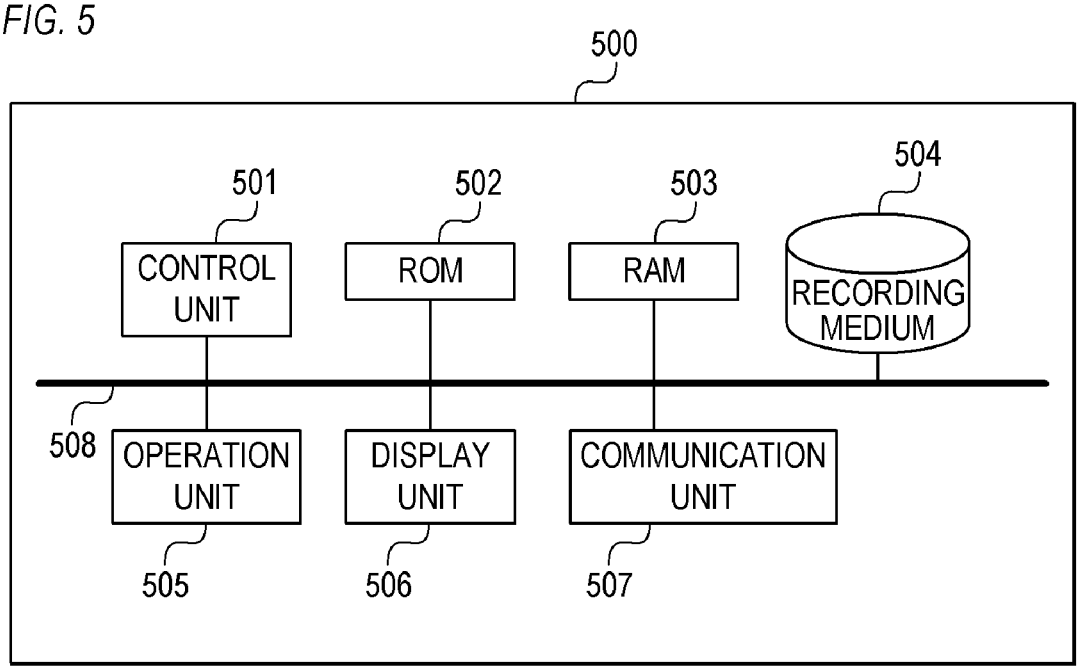
FIG. 5 is a block diagram illustrating the configuration of a PC.

FIG. 5 is a block diagram illustrating an example of the configuration of the PC 500. A control unit 501 is, for example, a central processing unit (CPU) that controls the overall PC 500. A read only memory (ROM) 502 stores programs and parameters in a non-transitory manner. A random access memory (RAM) 503 temporarily stores programs and data that are supplied from external equipment or the like. A recording medium 504 is, for example, a hard disk or a flash memory that is stationarily installed in the PC 500 or an optical disk, a magnetic card, an optical card, an IC card, or a memory card that is detachable from the PC 500. A file of images captured by the camera 100 is read from the recording medium 504. An operation unit 505 receives a user operation on the PC 500. An operation member used for a user operation may be a button or a touch panel that is provided on the PC 500 or a keyboard or a mouse that is detachable from the PC 500. A display unit 506 displays, for example, data held in the PC 500 or data supplied from the outside. The display unit 506 may be a part of the PC 500 or a separate display device of the PC 500. A communication unit 507 communicates with external equipment such as the camera 100. A system bus 508 connects the constituent elements of the PC 500 to enable communications among the constituent elements.

Figure 14A:
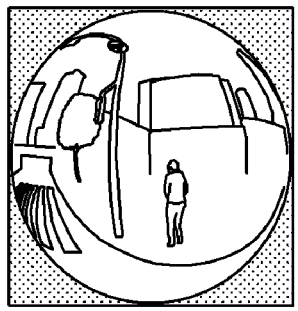
FIGS. 14A and 14B are schematic diagrams illustrating a live view display.
Figure 14B:
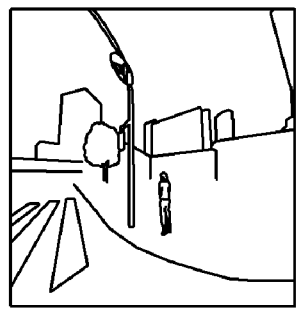
Figure 14C:
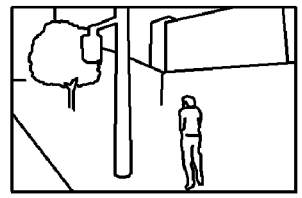
FIG. 14C is a schematic diagram illustrating a playback display.

In this case, it is assumed that a VR image captured by the lens unit 300 (dual-lens) or the like is entirely displayed during live view display, whereas a part of the VR image is displayed during playback display. Playback display is, for example, VR display that is provided on a PC or an HMD. FIGS. 14A and 14B illustrates an example of live view display. FIG. 14C illustrates an example of playback display. In FIG. 14A, an overall circular fish-eye image (equidistant projection image) is displayed as a VR image. In FIG. 14B, an overall equidistant cylindrical image is displayed as a VR image. The equidistant cylindrical image of FIG. 14B has the same angle of view as the circular fish-eye image of FIG. 14A. In FIG. 14C, the VR images in FIGS. 14A and 14B are partially displayed. For example, a circular fish-eye image is subjected to equidistant cylinder transformation, the image is subjected to perspective projection transformation, and the image having been subjected to the perspective projection transformation is partially cut and displayed, achieving the display of FIG. 14C. The perspective projection transformation is correction for bringing the view of an image close to an actual (real) view by a human. The perspective projection transformation is processing for reducing the distortion of an image. The equidistant cylinder transformation may be omitted. In dual-lens VR display, two images as parts of images having been subjected to perspective projection transformation are horizontally displayed next to each other (side by side). For example, if a left image (left-eye VR image) and a right image (right-eye VR image) are shown in dual-lens VR display through an HMD or the like, the left image and the right image are subjected to perspective projection transformation and are partially displayed next to each other in the horizontal direction.

In the live view display of FIGS. 14A and 14B, however, a captured angle of view is identifiable but an angle of view displayed during playback display cannot be identified. In the present embodiment, an angle of view displayed during playback display can be identified during live view display. In the following example, a right image and a left image are captured to provide live view display. One of a right image and a left image may be captured for live view display. Alternatively, a VR image captured with a single lens may be shown in live view display. A VR image for live view display may be a 360-degree image (omnidirectional image: whole-celestial spherical image) obtained by synthesizing multiple images captured in different directions.

Figure 6:
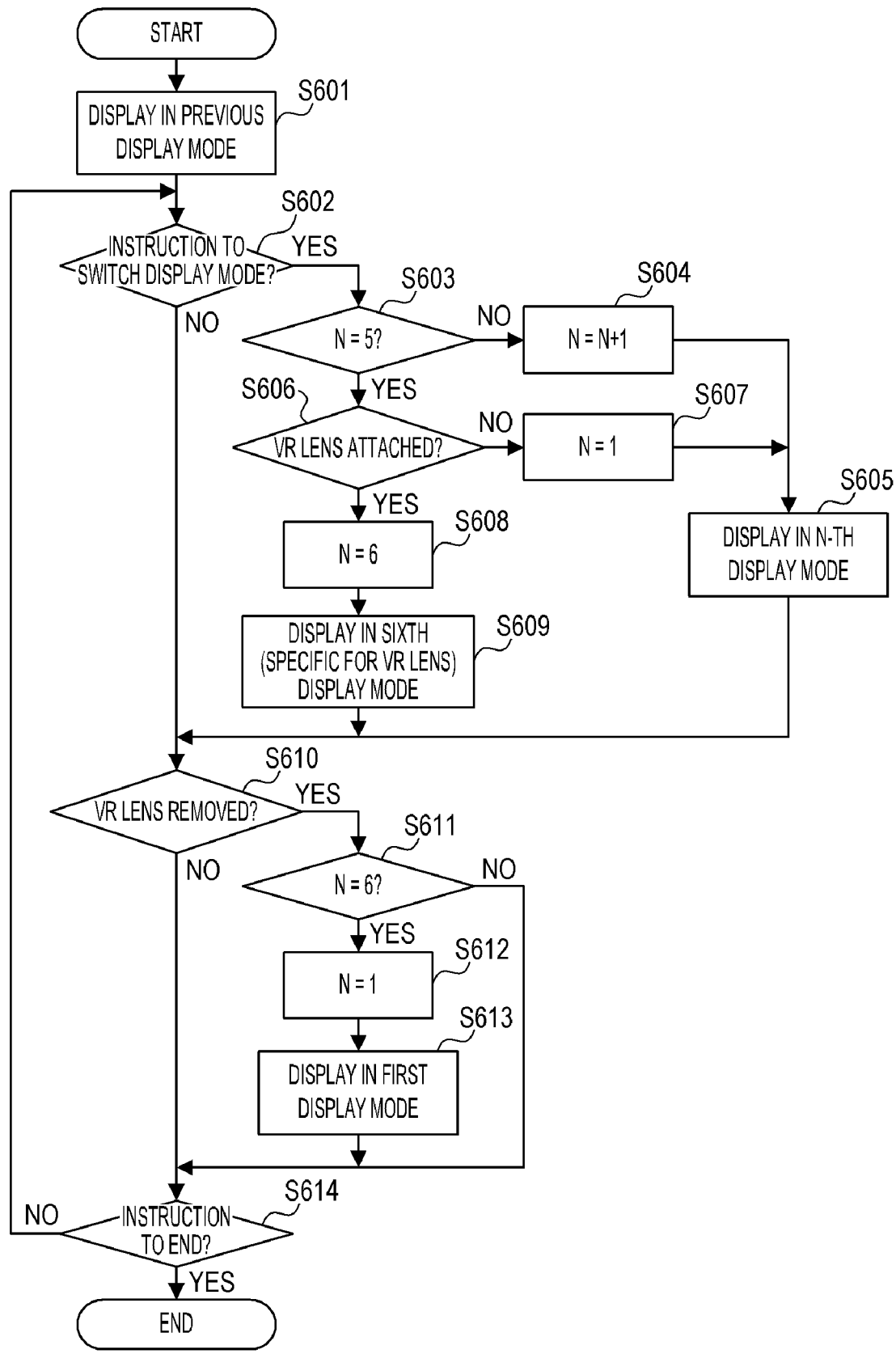
FIG. 6 is a flowchart indicating the operations of the camera.

FIG. 6 is a flowchart indicating an example of the operations (shooting-mode processing) of the camera 100 in the shooting mode. These operations are implemented by expanding and running programs, which are recorded in the nonvolatile memory 219, in the system memory 218 by the system control unit 50. For example, when the camera 100 is started in the shooting mode or the mode of the camera 100 is changed to the shooting mode, the operations of FIG. 6 are started. In the shooting-mode processing, still-image shooting and moving-image shooting are performed in addition to the following processing: In other words, the following processing is performed in a shooting standby state or during shooting.

In step S601, the system control unit 50 acquires information about a previous display mode from the nonvolatile memory 219 and displays an image (e.g., a live view image or an OSD image) in the previous display mode on the display unit 108. The information about the display mode is not particularly limited as long as the display mode can be identified. In the present embodiment, numbers are acquired as the information.

In step S602, the system control unit 50 determines whether an instruction to switch display modes has been provided by the user of the camera 100. If it is determined that an instruction to switch display modes has been provided, the process advances to step S603. Otherwise the process advances to step S610. The instruction to switch display modes is, for example, a press to the display-mode switching button 125.

In step S603, the system control unit 50 determines whether a number N for the current display mode (a display mode before being switched in response to the instruction to switch display modes in step S602) is 5 or not. If it is determined that the number N is 5, the process advances to step S606. Otherwise the process advances to step S604.

In step S604, the system control unit 50 increments the number N by one so as to sequentially switch display modes. In the present embodiment, six display modes numbered 1 to 6 are available.

In step S605, the system control unit 50 updates the display of the display unit 108 such that an image in the display mode of the number N is displayed on the display unit 108.

In step S606, the system control unit 50 determines whether a VR lens (a lens capable of capturing a VR image, e.g., a fish-eye lens) of the lens unit 300 or the like has been attached to the camera 100. If it is determined that the VR lens has been attached, the process advances to step S608. Otherwise the process advances to step S607.

In step S607, the system control unit 50 sets the number N at 1 such that the display mode of the number 6 is skipped to shift to the display mode of the number 1.

In this way, if a VR lens is not attached, the five display modes of the numbers 1 to 5 are switched such that the display mode number increments by one each time an instruction to switch the display modes is provided. When an instruction to switch the display modes is provided in the display mode of the number 5, the display mode is returned to that of the number 1.

FIG. 7A shows an example of display in the display mode of the number 1. FIG. 7B shows an example of display in the display mode of the number 2. FIG. 7C shows an example of display in the display mode of the number 3. FIG. 7D shows an example of display in the display mode of the number 4. FIG. 7E shows an example of display in the display mode of the number 5. In FIGS. 7A to 7C, live view images and display items (OSD images) are displayed. In FIG. 7D, only a live view image is displayed, whereas in FIG. 7E, a menu screen is displayed. FIGS. 7A to 7C have different kinds of display items. The display in FIGS. 7A to 7E is similar to conventional display, and thus a detailed explanation thereof is omitted.

In step S608, the system control unit 50 sets the number N at 6 to shift to the display mode of the number 6. The display mode of the number 6 is a display mode specific for a VR lens.

In step S609, the display of the display unit 108 is updated such that a screen is displayed in the display mode of the number 6 on the display unit 108.

In this way, if a VR lens is attached, the six display modes of numbers 1 to 6 are switched such that the display mode number increments by one each time an instruction to switch the display modes is provided. When an instruction to switch the display modes is provided in the display mode of the number 6, the display mode is returned to that of the number 1.

FIG. 7F shows an example of display in the display mode of the number 6. In FIG. 7F, a live view image is displayed, in which a right image and a left image are placed next to each other. An indicator 701 is displayed to be superimposed on the right image, and an indicator 702 is displayed to be superimposed on the left image. In the present embodiment, an image including a right image and a left image is called a live view image. Each of the right image and the left image may be called a live view image. The indicator 701 is a display item (frame) indicating a part displayed during playback display (during dual-lens VR display) in the angle of view of the right-eye optical system 301R. The indicator 702 is a display item (frame) indicating a part displayed during playback display (during dual-lens VR display) in the angle of view of the left-eye optical system 301L. More specifically, the indicators 701 and 702 are parts that are first displayed in VR display (dual-lens VR display) and are continuously displayed unless the user changes the viewing direction (point of view). Hereinafter display items such as the indicators 701 and 702 are referred to as magic windows. The magic window may be referred to as a part displayed in a predetermined viewing direction (for example, the front direction) of the user in the angle of view of a VR image. In the present embodiment, the magic window is displayed only in the display mode of the number 6 (a specific display mode).

The display of such a magic window allows the user to identify an angle of view displayed during playback display. Furthermore, during display with a browser or a head-mounted display (HDM), a viewer can visually confirm the range of a first view during shooting. This can more effectively capture a composition desired by the user or an object to be assigned with the highest priority. Moreover, the right image and the left image are displayed next to each other, allowing the user to identify a difference between the right image and the left image and whether the right image and the left image are captured without causing any problems. The display of the magic window of the right image and the magic window of the left window allows the user to further identify a difference between video viewed by the right eye and video viewed by the left eye in VR display.

In FIG. 7F, the indicator 701 indicates the central part of the right image while the indicator 702 indicates the central part of the left image. The position of an area indicated by the magic window is not particularly limited. An area indicated by the magic window may be relocatable. Only one of the indicator 701 and the indicator 702 may be displayed. The user only needs to visually confirm an area displayed by the magic window. This does not always require the display of the magic window all the time in subsequent shooting.

The way to determine the area of the magic window is not particularly limited. For example, as illustrated in FIG. 7G, a rectangular area indicating a part of an image having been subjected to perspective projection transformation is determined in advance as an area (angle of view) to be first displayed in VR display. Moreover, the inverse transformation of perspective projection transformation and the inverse transformation of the equidistant cylinder transformation are applied to the rectangular area, thereby determining the area of the magic window superimposed on a live view image before perspective projection transformation.

In step S610, the system control unit 50 determines whether the VR lens has been removed from the camera 100. If it is determined that the VR lens has been removed, the process advances to step S611. Otherwise the process advances to step S613.

In step S611, the system control unit 50 determines whether the number N for the current display mode is 6 or not. If it is determined that the number N is 6, the process advances to step S612. Otherwise the process advances to step S613.

In step S612, the system control unit 50 sets the number N at 1 to shift to the display mode of the number 1. As described above, the display mode of the number 6 is a display mode specific for a VR lens. After the VR lens is removed, the continuation of the display mode of the number 6 is not appropriate, so that the display mode is shifted to the display mode of the number 1, the display mode subsequent to the display mode of the number 6 according to the order in which the display modes are switched.

In step S613, the display of the display unit 108 is updated such that a screen is displayed in the display mode of the number 1 on the display unit 108.

In step S614, the system control unit 50 determines whether an instruction to end has been provided by the user of the camera 100. If it is determined that the instruction to end has been provided, the operations of FIG. 6 are ended. Otherwise the process advances to step S602. The instruction to end is, for example, an instruction to power off the camera 100 or an instruction to switch the mode of the camera 100 from the shooting mode to another mode. Specifically, the instruction to end is, for example, a press to the power switch 102 or a press to the mode-change switch 103.

The kinds and number of display modes switchable in response to an instruction to switch the display modes is not particularly limited. The display modes switchable in response to an instruction to switch the display modes may be customized from a menu screen or the like.

Figure 8:
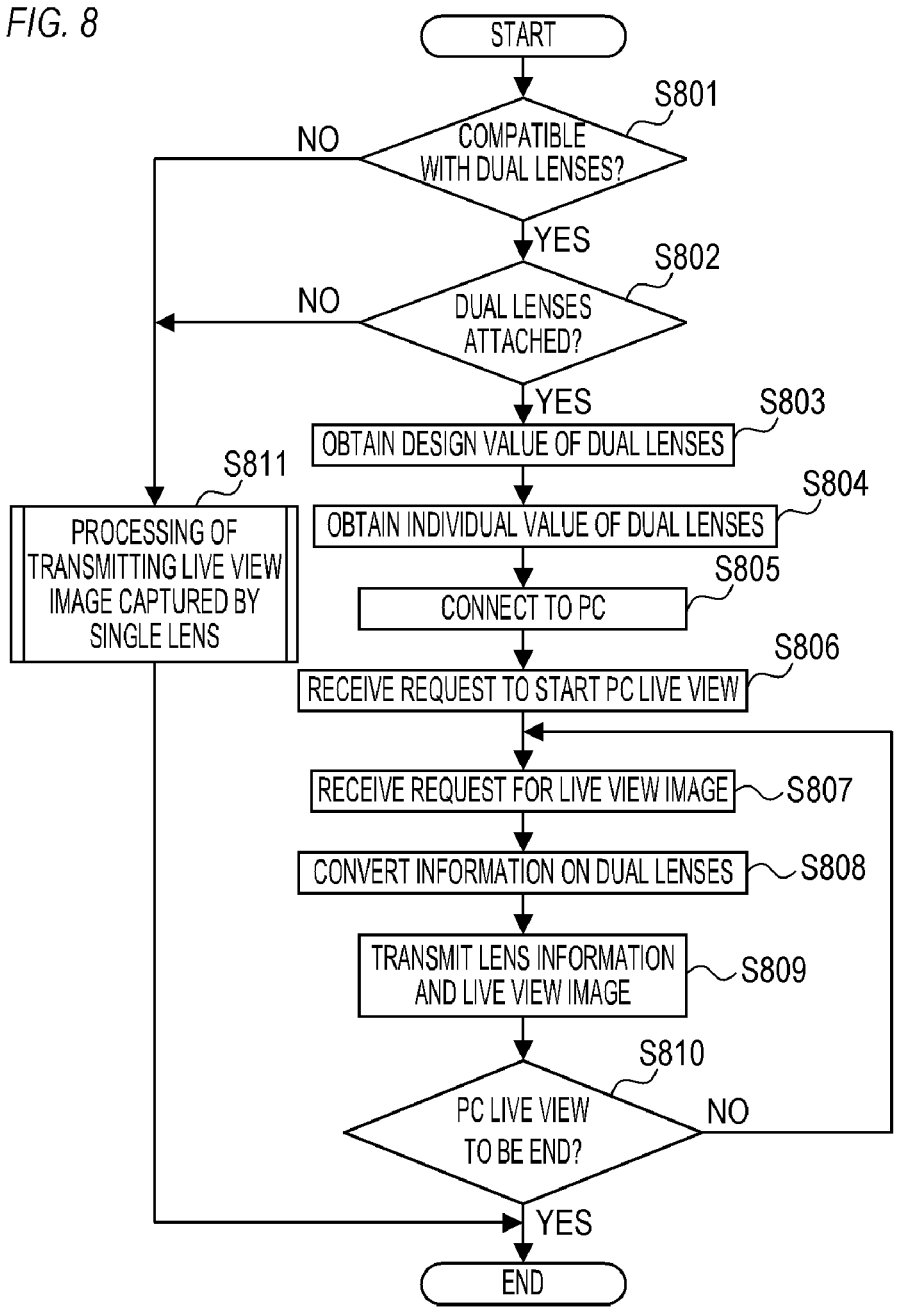
FIG. 8 is a flowchart indicating the operations of the camera.

FIG. 8 is a flowchart indicating an example of other operations of the camera 100. These operations are implemented by expanding and running programs, which are recorded in the nonvolatile memory 219, in the system memory 218 by the system control unit 50. For example, when the camera 100 is started, the operations of FIG. 8 are started. The operations of FIG. 8 are operations for the function of displaying a live view image, which is captured by the camera, on the display unit of the PC (PC live view). The operations of FIG. 8 are performed when the camera 100 is placed in a shooting standby state. When an instruction to start recording is inputted from the PC 500 during PC live view, still-image shooting or moving-image shooting is performed. At this point, the PC live view may be continued.

In step S801, the system control unit 50 determines whether the camera 100 is provided for dual lenses (e.g., the lens unit 300). In the operations of FIG. 8, it is assumed that dual lenses are dual VR lenses. For example, the system control unit 50 determines whether the firmware version of the system control unit 50 is compatible with dual lenses. If it is determined that the version is compatible with dual lenses, the process advances to step S802. Otherwise the process advances to step S811.

In step S802, the system control unit 50 determines whether dual lenses have been attached to the camera 100. If it is determined that dual lenses have been attached, the process advances to step S803. Otherwise the process advances to step S811. If dual lenses are attached in a state in which dual lenses are absent, the process advances to step S803. If attached dual lenses are removed and then a single lens is attached, the process advances to step S811. In the operations of FIG. 8, it is assumed that a single lens is an ordinary single lens (a single lens other than VR lenses).

In step S803, the system control unit 50 obtains the design value of attached (connected) dual lenses from the dual lenses. The design value is a parameter in design and is used for exchanging the positions of left and right images, which will be described later, and the equidistant cylinder transformation. For example, an image circle position, an image circle diameter, an angle of view, and a distortion correction coefficient in FIG. 11B are obtained.

In step S804, the system control unit 50 obtains the individual value of the attached (connected) dual lenses from the dual lenses. The individual value is a parameter specific for a lens unit, for example, an error during manufacturing. For example, an image-circle displacement, an optical-axis inclination, and an image magnification deviation in FIG. 11B are obtained. Using the individual value enables image processing with higher accuracy than the use of only a design value.

In step S805, the camera 100 is connected to the PC 500, and the system control unit 50 detects the connection of the camera 100 to the PC 500. In step S806, the system control unit 50 receives, from the PC 500, a request to start PC live view. In step S807, the system control unit 50 receives, from the PC 500, a request for a live view image. The request for a live view image includes information (resolution information) for specifying the resolution of a live view image as will be described later. The system control unit 50 performs the processing of step S809 so as to transmit a live view image with the specified resolution to the PC 500.

In step S808, the system control unit 50 converts the information (lens information on dual lenses; information on the two optical systems of dual lenses) obtained in steps S803 and S804, according to the coordinate system of the live view image to be transmitted. The information obtained in steps S803 and S804 cannot be used as it is for the image processing of the live view image. Thus, lens information is converted into information compliant with the coordinate system of the live view image in the present embodiment. The lens information may include information different from the information obtained in steps S803 and S804. For example, in the present embodiment, the lens information includes information on the area (angle of view) of the magic window. The lens information includes information on the magic window superimposed on the right image and information on the magic window superimposed on the left image.

In step S809, the system control unit 50 transmits, to the PC 500, the lens information converted in step S808 and the live view image. The system control unit 50 changes the resolution of the live view image based on the resolution information obtained in step S807 and transmits the live view image to the PC 500. In the present embodiment, the system control unit 50 of the camera 100 converts the lens information. The control unit 501 of the PC 500 may convert the lens information. At this point, the lens information before the conversion and a parameter necessary for converting the lens information are transmitted to the PC 500.

In step S810, the system control unit 50 determines whether to end PC live view. For example, if the camera 100 and the PC 500 are disconnected from each other or the user instructs the camera 100 or the PC 500 to end PC live view, it is determined that the PC live view is to be ended. If it is determined that the PC live view is to be ended, the operations of FIG. 8 are ended. Otherwise the process advances to step S807.

If a single lens (ordinary single lens; a single lens other than VR lenses) is attached to the camera 100, the processing of step S811 is performed. In step S811, the system control unit 50 transmits, to the PC 500, a live view image captured by a single lens. The processing of step S811 is identical to conventional processing for transmitting, to external equipment, a live view image captured by a single lens, and thus a detailed explanation thereof is omitted. In the present embodiment, when a live view image captured by a single lens is transmitted to the PC 500, the system control unit 50 does not acquire information (including a design value and an individual value) on the attached single lens from the single lens or transmit the information to the PC 500.

Figure 9:
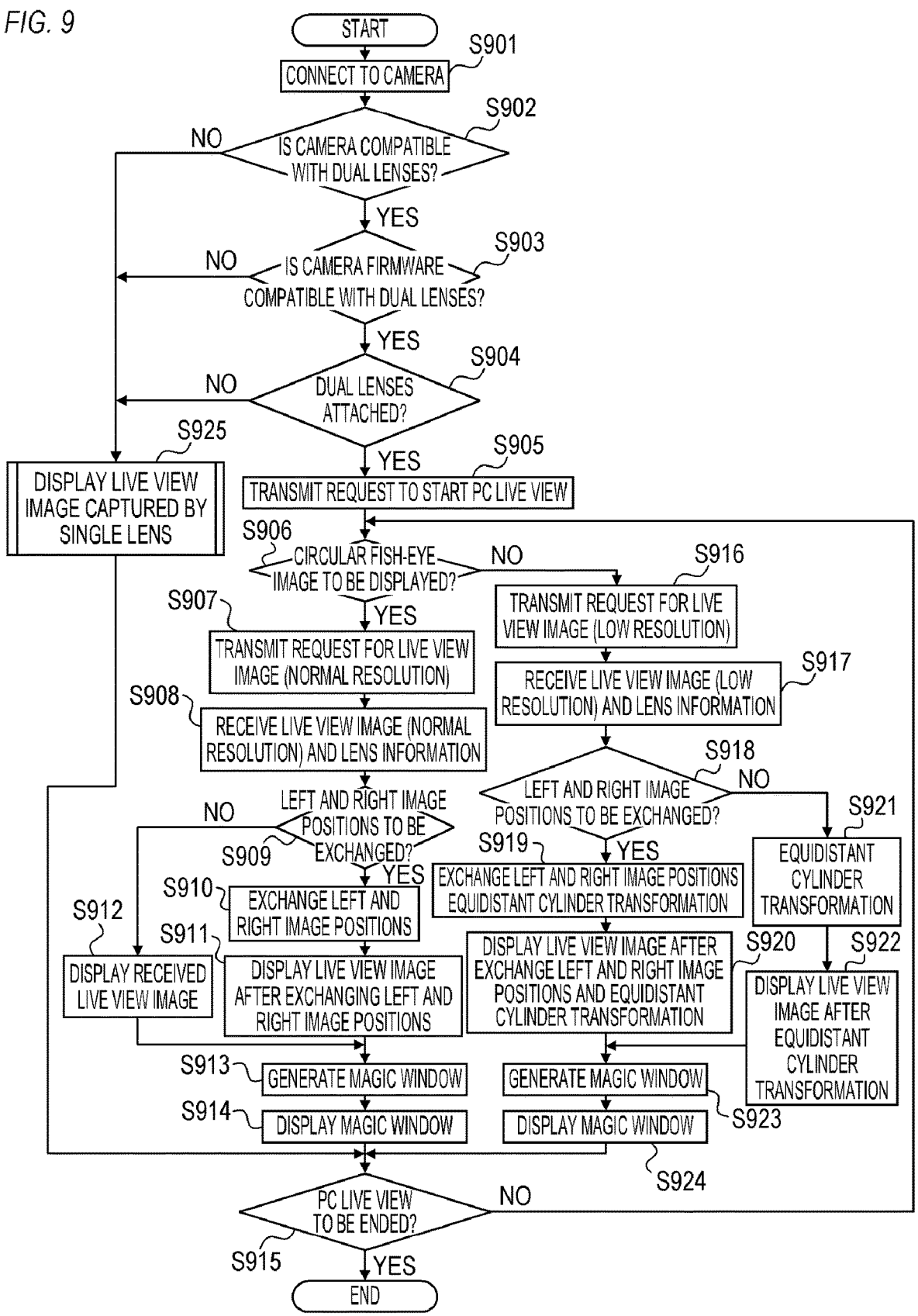
FIG. 9 is a flowchart indicating the operations of the PC.

FIG. 9 is a flowchart indicating an example of the operations of the PC 500. These operations are implemented by expanding and running programs (application programs), which are recorded in the ROM 502, in the RAM 503 by the control unit 501. For example, when the user instructs the PC 500 to start a specific application, the operations of FIG. 9 are started. The operations of FIG. 9 are operations for the function of displaying a live view image, which is captured by the camera, on the display unit of the PC (PC live view).

In step S901, the camera (e.g., the camera 100) is connected to the PC 500, and the control unit 501 detects the connection of the camera to the PC 500.

In step S902, the control unit 501 determines whether the camera connected in step S901 is compatible with dual lenses (e.g., the lens unit 300). In the operations of FIG. 9, it is assumed that dual lenses are dual VR lenses. For example, the control unit 501 acquires model information on the camera from the connected camera and determines whether the camera is compatible with dual lenses based on the acquired model information. If it is determined that the camera is compatible with dual lenses, the process advances to step S903. Otherwise the process advances to step S925. The camera compatible with dual lenses is, for example, a camera to which dual lenses can be attached.

In step S903, the control unit 501 determines whether the firmware of the camera connected in step S901 is compatible with dual lenses. For example, the control unit 501 acquires version information on the firmware of the camera from the connected camera and determines whether the version of the firmware of the connected camera is compatible with dual lenses based on the acquired information. If it is determined that the firmware is compatible with dual lenses, the process advances to step S904. Otherwise the process advances to step S925.

Even if the camera compatible with dual lenses is connected to the PC 500, the connected camera may become incompatible with dual lenses because of an old firmware version of the connected camera. Thus, the processing of step S903 is necessary. Since various cameras are connectable to the PC 500, cameras incompatible with dual lenses may be connected to the PC 500 regardless of the version of the firmware. Thus, the processing of step S902 is necessary before the processing of step S903.

In step S904, the control unit 501 determines whether dual lenses have been attached to the camera connected in step S901. If it is determined that dual lenses have been attached, the process advances to step S905. Otherwise the process advances to step S925.

In step S905, the control unit 501 transmits a request to start PC live view to the camera connected in step S901.

Figure 13A:
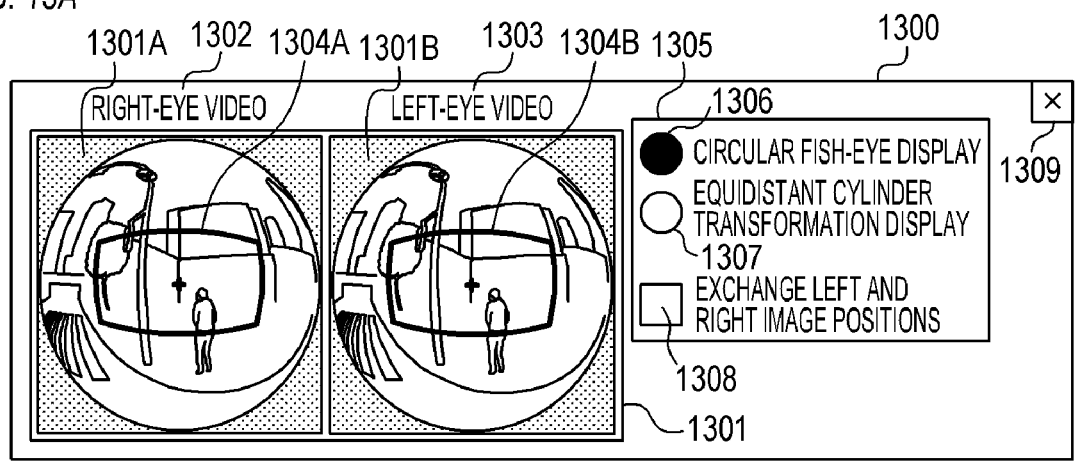

In step S906, the control unit 501 determines whether to provide circular fish-eye display. If it is determined that circular fish-eye display is to be provided, the process advances to step S907. Otherwise (if equidistant cylindrical display is provided) the process advances to step S916. In step S906, for example, whether to provide circular fish-eye display is determined depending upon whether a radio button 1306 in FIGS. 13A to 13D is selected or not. In FIGS. 13A and 13C, the radio button 1306 is selected, whereas in FIGS. 13B and 13D, the radio button 1306 is not selected. If the radio button 1306 is selected, it is determined that circular fish-eye display is to be provided, and then the process advances to step S907. If the radio button 1306 is not selected, the process advances to step S916.

In step S907, the control unit 501 transmits a request for a live view image to the camera connected in step S901. In the present embodiment, the request for a live view image in step S907 is a request for a live view image having a normal resolution. The normal resolution is, for example, 4K resolution.

In step S908, the control unit 501 receives, from the camera connected in step S901, a live view image captured by the camera and lens information on dual lenses attached to the camera. The resolution of the live view image received in step S908 is the normal resolution. The lens information received in step S908 is information converted according to the received live view image (for example, the lens information converted in step S808 of FIG. 8).

In step S909, the control unit 501 determines whether to correct (exchange) the positions of a right image and a left image. If it is determined that the positions of the left and right images are to be exchanged, the process advances to step S910. Otherwise the process advances to step S912. In step S909, for example, whether to exchange the positions of the left and right images is determined based on whether a check box 1308 in FIGS. 13A and 13C has been checked. If the check box 1308 has been checked, it is determined that the positions of the left and right images are to be exchanged, and then the process advances to step S910. If the check box 1308 has not been checked, the process advances to step S912.

The characteristics of an image captured with attached dual lenses will be described below. In the case of an ordinary single lens, an image (an image rotated) 180° vertically and horizontally inverted from its actual view is formed on the imaging unit 211. Thus, the formed image is entirely rotated 180° to obtain (form) an image matching its actual view. In the case of dual lenses, a right image and a left image are rotated 180° from their actual views and are formed on the imaging unit 211. The layout of the right image and the left image is not particularly limited. In the present embodiment, it is assumed that the right image is formed on the right side while the left image is formed on the left side on the imaging unit 211. As in the case of an ordinary single lens, when the formed image (including the right image and the left image) is entirely rotated 180°, the right image and the left image can be matched with their actual views, but the positions of the right image and the left image are exchanged with each other. In other words, the positional relationship between the left and right images is inverted, so that an image is captured with the right image disposed on the left side and the left image disposed on the right side. The exchange of the positions of the left and right images can display the right image and the left image at positions corresponding to the two optical systems (the right-eye optical system 301R and the left-eye optical system 301L). In the operations of FIG. 6, the display unit 108 of the camera 100 displays a live view image in which the positions of right and left images have not been exchanged (the right image on the left side and the left image on the right side).

In step S910, based on the lens information obtained in step S908, the control unit 501 exchanges the positions of a right image and a left image in the live view image obtained in step S908 and generates a processed live-view image (the positions of the left and right images have been exchanged). Based on center coordinates (the centers of the optical axes of the left-eye optical system 301L and the right-eye optical system 301R) included in the lens information received with the live view image, the control unit 501 exchanges the positions of the right image and the left image in the live view image and generates a processed live-view image. For example, the control unit 501 specifies the area of the right image in the live view image based on the center coordinate of the right image (the center of the optical axis of the right-eye optical system 301R) and specifies the area of the left image in the live view image based on the center coordinate of the left image (the center of the optical axis of the left-eye optical system 301L). The control unit 501 then exchanges the positions of the two specified areas. In the present embodiment, a right image and a left image are horizontally placed next to each other in a live view image. By exchanging the positions of the left and right images, the positional relationship between the right image and the left image is horizontally inverted. The diameters (diameter or radius) of the right image and the left image may be acquired and used from dual-lens information in order to specify the areas of the right image and the left image with higher accuracy.

A method for exchanging the positions of the left and right images is not limited to the foregoing method. For example, displacements 1005, 1006, 1009, and 1010 in FIG. 10A may be obtained from the dual-lens information, a right image and a left image may be disposed while keeping the obtained displacements during the exchange of the positions of the right and left images, and other areas may be filled in with black. The displacement 1005 is a distance from the left end of a live view image to the left end of the right image, and the displacement 1006 is a distance from the center of the live view image to the right end of the right image. When the positions of the left and right images are exchanged, the displacement 1005 is a distance from the left end of the live view image to the left end of the left image, and the displacement 1006 is a distance from the center of the live view image to the right end of the left image. Likewise, the displacement 1009 is a distance from the right end of the live view image to the right end of the left image, and the displacement 1010 is a distance from the center of the live view image to the left end of the left image. When the positions of the left and right images are exchanged, the displacement 1009 is a distance from the right end of the live view image to the right end of the right image, and the displacement 1010 is a distance from the center of the live view image to the left end of the right image.

In step S911, the control unit 501 displays the processed live-view image, which is generated in step S910, on the display unit 506.

In step S912, the control unit 501 displays the live-view image, which is obtained in step S908, on the display unit 506.

In step S913, based on the lens information (information on the magic windows) obtained in step S908, the control unit 501 generates the magic window (frame). In the present embodiment, the magic window to be superimposed on the right image is generated based on the information on the magic window superimposed on the right image, and the magic window to be superimposed on the left image is generated based on information on the magic window superimposed on the left image. A method for generating the magic windows will be specifically described later in accordance with FIGS. 12A and 12B.

In step S914, the control unit 501 displays the magic window, which is generated in step S913, on the display unit 506. When the live view image is partially enlarged and displayed in response to a user instruction, the generation and display of the magic window is preferably avoided. For example, in many cases, a live view image is enlarged and displayed to specifically confirm a part of the live view image. Moreover, the magic window may interfere with the confirmation of the detail of the live view image. Thus, when the live view image is enlarged and displayed, the magic window is preferably hidden. The magic window may be displayed when the live view image is enlarged and displayed. In this case, the magic window needs to be extended according to the enlargement of the live view image such that the magic window indicates an angle of view to be displayed during playback display.

In step S915, the control unit 501 determines whether to end PC live view. For example, if the camera 100 and the PC 500 are disconnected from each other or the user instructs the camera 100 or the PC 500 to end PC live view, it is determined that the PC live view is to be ended. The instruction to end PC live view is, for example, a press to an exit button 1309 in FIGS. 13A to 13D. If it is determined that the PC live view is to be ended, the operations of FIG. 9 are ended. Otherwise the process advances to step S906. This can switch display on the display unit 506 (live view display) among circular fish-eye display with an exchange of the positions of left and right images, circular fish-eye display without an exchange of the positions of left and right images, equidistant cylindrical display (described later) with an exchange of the positions of left and right images, and equidistant cylindrical display (described later) without an exchange of the positions of left and right images.

As described above, if equidistant cylindrical display is provided, the process advances from step S906 to step S916. In step S916, the control unit 501 transmits a request for a live view image to the camera connected in step S901. In the present embodiment, the request for a live view image in step S916 is a request for a live view image having a low resolution (lower than the normal resolution). In the case of equidistant cylindrical display, the equidistant cylinder transformation (transformation from a circular fish-eye image to an equidistant cylindrical image) is necessary. The higher the resolution of an image to be subjected to the equidistant cylinder transformation, the long the time for the equidistant cylinder transformation. This increases a delay by the equidistant cylinder transformation. In the present embodiment, a live view image with a low resolution is requested to increase the speed of the equidistant cylinder transformation (shorten the time for the equidistant cylinder transformation). If the equidistant cylinder transformation causes a delay within tolerance, a live view image with a normal resolution may be requested in equidistant cylindrical display.

In step S917, the control unit 501 receives, from the camera connected in step S901, a live view image captured by the camera and lens information on dual lenses attached to the camera. The resolution of the live view image received in step S917 is a low resolution. The lens information received in step S917 is information converted according to the received live view image (for example, the lens information converted in step S808 of FIG. 8).

In step S918, the control unit 501 determines whether to exchange the positions of the left and right images. If it is determined that the positions of the left and right images are to be exchanged, the process advances to step S919. Otherwise the process advances to step S921. In step S918, for example, whether to exchange the positions of the left and right images is determined based on whether the check box 1308 in FIGS. 13B and 13D has been checked. If the check box 1308 has been checked, it is determined that the positions of the left and right images are to be exchanged, and then the process advances to step S919. If the check box 1308 has not been checked, the process advances to step S921.

In step S919, based on the lens information obtained in step S917, the control unit 501 exchanges the positions of the right image and the left image in the live view image obtained in step S917 and transforms each of the left and right images into an equidistant cylindrical image. In other words, the control unit 501 exchanges the positions of the right and left images and transforms the images into equidistant cylinders, thereby generating a processed live view image.

Based on center coordinates (the centers of the optical axes of the left-eye optical system 301L and the right-eye optical system 301R) included in the lens information received with the live view image, the control unit 501 generates a map for the equidistant cylinder transformation. For example, according to the same method as in step S910, the control unit 501 specifies the areas of a right image and a left image in a live view image and generates a map based on the two specified areas. Equidistant cylinder transformation is transformation in which a circular fish-eye image assumed to be a sphere has latitude lines (horizontal lines) and longitude lines (vertical lines) crossing each other at right angles as in equidistant cylindrical projection for a map. Through the equidistant cylinder transformation, the circular fish-eye image is transformed into an equidistant cylindrical image shaped like a rectangle. The map indicates positions in the image before the transformation, the positions corresponding to pixels after the transformation. In this case, the map for the equidistant cylinder transformation is generated such that the circular fish-eye image can be transformed into an equidistant cylindrical image and the positions of the right image and the left image can be corrected. The control unit 501 performs the equidistant cylinder transformation by using the generated map, thereby generating a processed live view image.

The exchange of the positions of the left and right images is regarded as a part of the equidistant cylinder transformation. The exchange of the positions of the images may be separated from the equidistant cylinder transformation. Based on individual values included in the lens information received with the live view image, the control unit 501 may adjust and use a design value included in the lens information. For example, image circle positions (the center coordinates of the right image and the left image in the live view image) are adjusted based on an image-circle displacement in FIG. 11B. If an individual value is a difference from the design value, the individual value is added to the design value. If an individual value is an absolute value equivalent to the design value, the design value is replaced with the individual value. Based on the adjusted center coordinates (the centers of the optical axes of the left-eye optical system 301L and the right-eye optical system 301R), the control unit 501 generates a map for the equidistant cylinder transformation according to a method similar to the foregoing method. Using the adjusted center coordinates enables the equidistant cylinder transformation with higher accuracy.

In step S920, the control unit 501 displays the processed live-view image, which is generated in step S919, on the display unit 506.

In step S921, the control unit 501 does not exchange the positions of the right image and the left image in the live view image obtained in step S917 but transforms each of the left and right images into an equidistant cylindrical image. In other words, the control unit 501 generates a processed live-view image by the equidistant cylinder transformation without exchanging the positions of the left and right images.

In step S922, the control unit 501 displays the processed live-view image, which is generated in step S921, on the display unit 506.

In step S923, based on the lens information (information on the magic windows) obtained in step S917, the control unit 501 generates the magic window (frame). In the present embodiment, the magic window to be superimposed on the right image is generated based on the information on the magic window superimposed on the right image, and the magic window to be superimposed on the left image is generated based on information on the magic window superimposed on the left image. A method for generating the magic windows will be specifically described later in accordance with FIGS. 12A and 12B.

In step S924, the control unit 501 displays the magic window, which is generated in step S923, on the display unit 506. As described above, when the live view image is partially enlarged and displayed in response to a user instruction, the generation and display of the magic window is preferably avoided.

If the camera 100 is not compatible with dual lenses or a single lens is attached to the camera 100, the processing of step S925 is performed. In the operations of FIG. 9, it is assumed that a single lens is an ordinary single lens (a single lens other than VR lenses). In step S925, the control unit 501 displays, on the display unit 506, a live view image captured by a single lens. The processing of step S925 is identical to conventional processing in which a PC or the like displays a live view image captured by a single lens, and thus a detailed explanation thereof is omitted.

In steps S910, S919, and S921, the control unit 501 performs image processing on a live view image acquired from the connected camera. In step S915 subsequent to steps S910, S919, and S921, the control unit 501 determines whether to end PC live view. If the PC live view is continued, the processing is returned to step S906 preceding steps S910, S919, and S921. Thus, in the operations of FIG. 9, image processing in any one of steps S910, S919, and S921 may be repeatedly performed.

In order to enhance the speed of image processing, the control unit 501 may record, in the RAM 503, information related to performed image processing and use the information from subsequent image processing. For example, the control unit 501 records a correspondence (image processing map) between a pixel before image processing and a pixel after image processing. The image processing map can be continuously used unless the resolution of a live view image or the lens information changes. When image processing in any one of steps S910, S919, and S921 is performed, the control unit 501 records an image processing map for the image processing. When the same image processing is performed again, the control unit 501 performs the image processing using the recorded image processing map. This can increase the speed of the image processing.

The operations of FIGS. 8 and 9 are premised on dual VR lenses or an ordinary single lens (a single lens other than VR lenses) to be attached to the camera. The operations may be changed as appropriate in preparation for other situations. For example, the operations of FIGS. 8 and 9 may be changed to superimpose the magic window on a live view image also when a single VR lens is attached. The operations of FIGS. 8 and 9 may be changed to superimpose the magic window on a live view image also when a 360-degree image (omnidirectional image: whole-celestial spherical image) is displayed as the live view image. The operations of FIGS. 8 and 9 may be changed to avoid the superimposition of the magic window on a live view image when dual lenses other than VR lenses are attached.

Figure 10A:
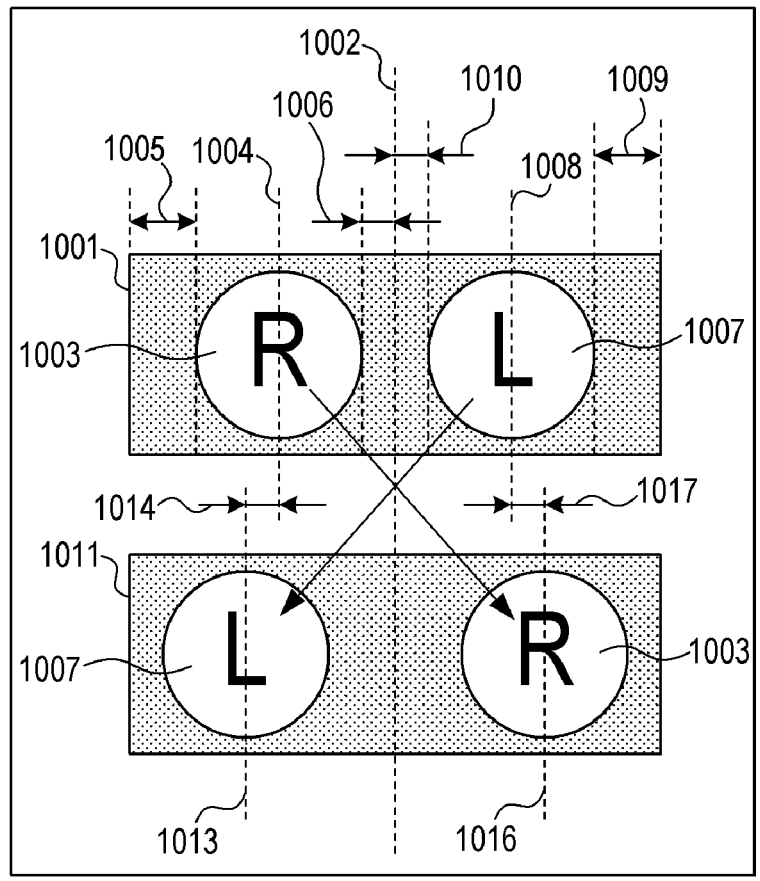
FIGS. 10A and 10B are schematic diagrams illustrating the exchange of the positions of left and right images.
Figure 10B:
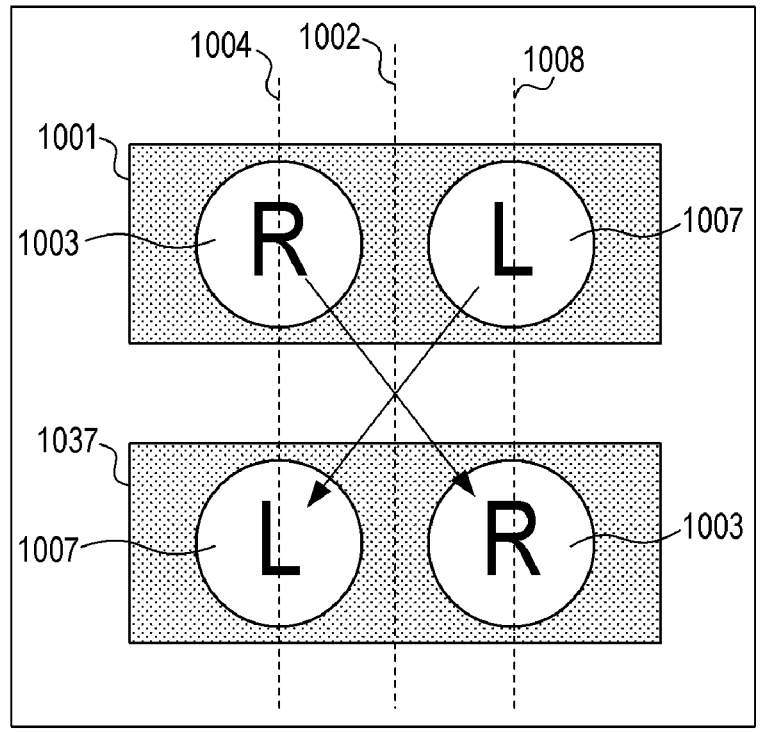

FIGS. 10A and 10B are schematic diagrams illustrating the exchange of the positions of left and right images; FIG. 10A illustrates a conventional exchange of the positions of the left and right images without using information on dual lenses. FIG. 10B illustrates an exchange of the positions of the left and right images by using information on dual lenses according to the present embodiment.

As illustrated in FIGS. 10A and 10B, an image 1001 before the exchange includes a right image 1003 disposed as a circular fish-eye image on the left side and a left image 1007 disposed as a circular fish-eye image on the right side. The center coordinate of the right image in the lateral direction is a coordinate 1004 while the center coordinate of the left image in the lateral direction is a coordinate 1008.

In FIG. 10A, the image 1001 is divided into a left-half image and a right-half image at a center coordinate 1002 of the image 1001, and then the left-half image and the right-half image are exchanged with each other. In other words, the left-half image is moved to the right of the right-half image. An image 1011 is an image formed after the exchange of the left and right images.

In FIG. 10A, the displacement 1006 is smaller than the displacement 1005. In other words, in the image 1001, the right image 1003 is deviated from the center of the left half of the image 1001 toward the center of the image 1001. Likewise, the displacement 1010 is smaller than the displacement 1009. In other words, in the image 1001, the right image 1007 is deviated from the center of the right half of the image 1001 toward the center of the image 1001. Hence, in the image 1011, a center coordinate 1013 of the left image 1007 in the lateral direction is displaced from the center coordinate 1004 by a distance 1014, and a center coordinate 1016 of the right image 1003 in the lateral direction is displaced from the center coordinate 1008 by a distance 1017.

By using the lens information in the present embodiment, the center coordinate of the left image in the lateral direction can be aligned with the center coordinate 1004, and the center coordinate of the right image in the lateral direction can be aligned with the center coordinate 1008 in an image 1037 where the positions of the left and right images have been exchanged (FIG. 10B).

FIG. 11A is a schematic diagram indicating an example of lens information that is acquired from dual lenses and is transmitted to the PC. The lens information includes:
1. lens design value
2. lens individual value
3. lens flag
4. lens focal length
5. lens temperature
6. magic window information The lens design value is a design value for correcting an aberration. In the manufacturing process of dual lenses, each of the two optical systems (the left-eye optical system 301L and the right-eye optical system 301R) has an error, for example, decentering or inclination of the lens. If the positions of the left and right images are exchanged or the equidistant cylinder transformation is performed without consideration of an error, the quality of dual VR display is reduced, leading to difficulty in obtaining a satisfactory stereoscopic view. The lens individual value is, for example, the measurement result of an error detected in the manufacturing process of dual lenses. The lens design value and the lens individual value will be specifically described later in accordance with FIG. 11B.

The lens flag is a flag indicating dual lenses and can be used for determining whether dual lenses have been used. The lens focal length is a distance from "principal point," which is the center of the lens, to an image pickup device (image-forming position). The lens focal length may be or does not need to be a common parameter of the two optical systems (the left-eye optical system 301L and the right-eye optical system 301R) of dual lenses. In order to provide high-quality dual-lens VR display by accurately exchanging the positions of the left and right images or performing the equidistant cylinder transformation, a detailed (high-accuracy) lens focal length is necessary. The lens temperature is a temperature of dual lenses and is used for identifying an environmental temperature or the like at the time of imaging. The magic window information is information on the area of the magic window. In the present embodiment, the information is used for generating the magic window. The magic window information is prepared for each of the two optical systems (the left-eye optical system 301L and the right-eye optical system 301R) of dual lenses. The magic window information may be prepared in advance in the camera 100 or may be generated in the camera 100. The magic window information may be prepared in advance in the PC 500 or may be generated in the PC 500.

FIG. 11B is a schematic diagram indicating the detail of the lens design value and the lens individual value. In the present embodiment, the lens design value and the lens individual value are used for exchanging the positions of left and right images and the equidistant cylinder transformation.

The lens design value includes:
1. image circle position
2. image circle diameter
3. angle of view
4. distortion correction coefficient The image circle position is the center coordinate of the optical axis of the optical system in an image to be captured. The image circle position is prepared for each of the two optical systems (the left-eye optical system 301L and the right-eye optical system 301R) of dual lenses. In other words, the image circle position is the center coordinate of an image circle (circular fish-eye image) formed on the image pickup device. The image circle position is prepared for each of the right image and the left image. The origin point of coordinates is, for example, the center of the image pickup device (the center of an image to be captured). The image circle position includes a coordinate in the horizontal direction and a coordinate in the vertical direction. The image circle position may be used from a variety of information on the center of the optical axis of the optical system in an image to be captured. For example, the image circle position may be a distance from a predetermined position (the center or an upper-left corner) in an image to the center of the optical axis.

The image circle diameter is the diameter of an image circle (circular fish-eye image) formed on the image pickup device. The angle of view is an angle of view of an image circle (circular fish-eye image) formed on the image pickup device. The distortion correction coefficient is the ratio of a design image height to the ideal image height of the lens. A distortion correction coefficient may be set for each image height, and a distortion correction coefficient may be calculated by interpolation in which a plurality of distortion correction coefficients are used. An approximate polynomial may be set for the relationship between an image height and a distortion correction coefficient. An image circle diameter, an angle of view, and a distortion correction coefficient may be or do not need to be common parameters of the two optical systems (the left-eye optical system 301L and the right-eye optical system 301R) of dual lenses.

The magic window may be displayed based on an image circle position, an image circle diameter, and an angle of view. Also in this method, the magic window can be displayed with high quality. In order to properly display the magic window, the PC 500 optionally edits and uses an image circle position, an image circle diameter, and an angle of view. For example, the PC 500 multiplies an image circle position or an image circle diameter by a coefficient.

The lens individual value includes:
5. image circle displacement
6. optical axis inclination
7. image magnification deviation These kinds of information are prepared by measurements of the two optical systems (the left-eye optical system 301L and the right-eye optical system 301R) of dual lenses.

The image circle displacement is a deviation of the center coordinate of an image circle (circular fish-eye image), which is formed on the image pickup device, from the design value. For example, the image circle displacement includes a deviation in the horizontal direction and a deviation in the vertical direction. A deviation in the horizontal direction is indicated by coordinates in the horizontal direction, and a deviation in the vertical direction is indicated by coordinates in the vertical direction with the origin point located at the coordinates of a design value (two-dimensional coordinates including coordinates in the horizontal direction and coordinates in the vertical direction). The optical axis inclination is a deviation from the design value in the direction of the optical axis near an object. For example, the optical axis inclination includes a deviation in the horizontal direction and a deviation in the vertical direction. A deviation in each direction is indicated by an angle. The image magnification deviation is a deviation of the size of an image circle (circular fish-eye image), which is formed on the image pickup device, from the design value. The deviation is indicated by, for example, a ratio to the design value.

Information included in the lens information is not limited to the foregoing information. For example, the lens information may include the boundary positions (the edge position of a circular fish-eye image; positions indicated by the displacements 1005, 1006, 1009, and 1010 or the like) of the right image and the left image in the live view image. The lens information may include midpoint coordinates between the right image and the left image in the live view image. In many cases, the midpoint coordinates match the center coordinates of the live view image. The lens information may include correction data (e.g., a correction value obtained by the calibration of dual lenses) for increasing the accuracy of the exchange of the positions of the left and right images and the equidistant cylinder transformation.

FIG. 11C is a schematic diagram illustrating an example of the camera information generated in the camera. For example, the camera information is used for providing high-quality VR display. The camera information includes:
1. camera recording area information
2. intra-camera accelerometer information
3. right exposure correction information The camera recording area information is information on effective image areas. Displayable effective image areas vary depending on the sensor of the camera or the recording mode. The PC 500 uses the camera recording area information in order to provide more accurate display. The intra-camera accelerometer information is orientation information obtained by using an acceleration sensor (level) in the camera. The information indicates the orientation of the camera in the rolling direction or the pitch direction. The PC 500 uses the intra-camera accelerometer information in order to identify the orientation of the camera during shooting. The PC 500 performs, for example, electronic vibration isolation or horizontal correction (zenith correction that brings the vertical direction of display close to the vertical direction of an actual space). The right exposure correction information is an exposure set value for bringing the exposure of the right image close to the exposure of the left image. The PC 500 uses the right exposure correction information in order to provide natural (less awkward) dual-lens VR display.

Figure 12A:
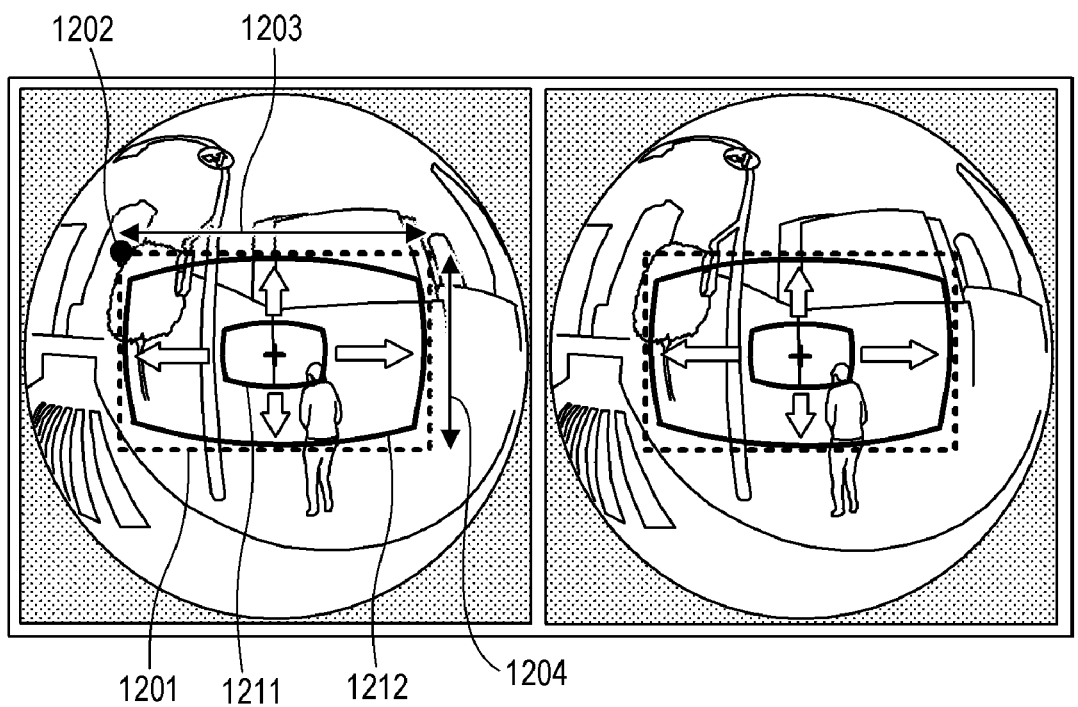
FIGS. 12A and 12B are schematic diagrams illustrating a method for generating a magic window.
Figure 12B:
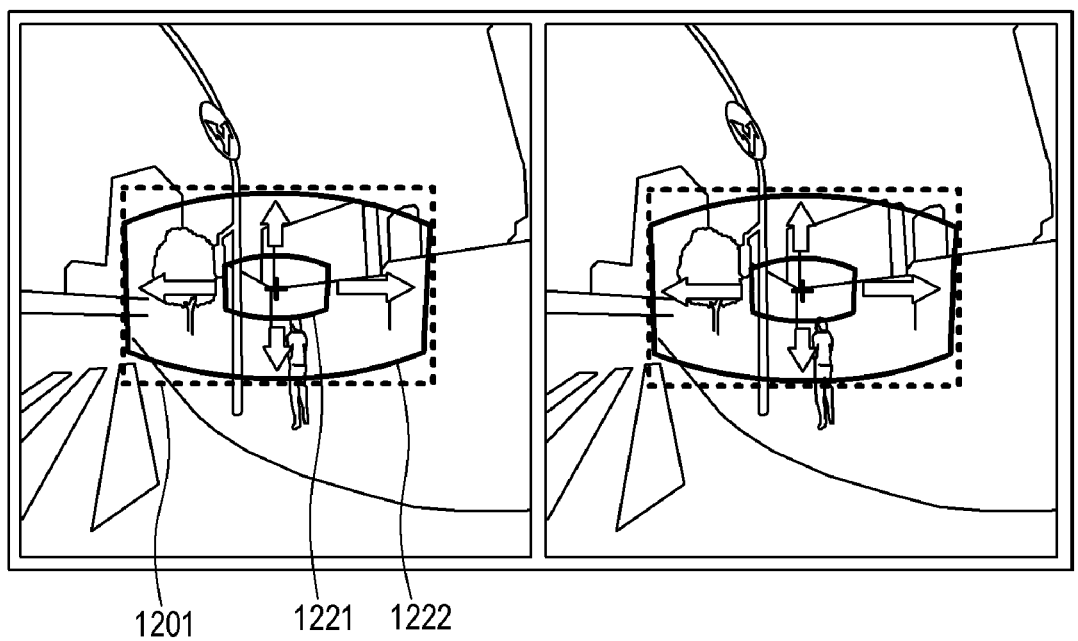

FIGS. 12A and 12B illustrate an example of the method for generating the magic window. FIG. 12A illustrates processing for circular fish-eye display, that is, the processing of step S913 in FIG. 9. FIG. 12B illustrates the processing for equidistant cylindrical image. i.e., the processing of step S923 in FIG. 9. The method for generating the magic window displayed on the left side will be described below. The magic window displayed on the right side is also generated by the same method.

In this method, a position 1202 (e.g., coordinates at the upper left corner), a width 1203, and a height 1204 of a rectangle 1201 circumscribed on the magic window are obtained as magic window information. The control unit 501 of the PC 500 identifies the rectangle 1201 from the position 1202, the width 1203, and the height 1204.

Referring to FIG. 12A, processing (step S913) for circular fish-eye display will be described below. The ROM 502 or the RAM 503 stores a frame image 1211 (point group) in advance. The control unit 501 generates a magic window 1212 by zooming in or out (enlarging or reducing) the frame image 1211 such that the frame image 1211 is inscribed in the rectangle 1201 (the frame image 1211 serves as the magic window 1212). The magic window information may be, for example, functions expressing figures. Likewise, the frame image 1211 may be replaced with, for example, a function expressing a figure.

Referring to FIG. 12B, processing (step S923) for equidistant cylinder display will be described below. The control unit 501 obtains a frame image 1221 by applying, also to the frame image 1211, the equidistant cylinder transformation as in the transformation of a circular fish-eye image into an equidistant cylindrical image. The control unit 501 generates a magic window 1222 by zooming in or out the frame image 1221 such that the frame image 1221 is inscribed in the rectangle 1201. Equidistant cylinder transformation may be also applied to the rectangle 1201, and then the frame image 1221 may be inscribed in the rectangle after the transformation.

FIGS. 13A to 13D are schematic diagrams illustrating an example of display (PC live view display) on an application screen displayed on the display unit 506 by the control unit 501. A screen 1300 is the application screen (remote live view screen). The screen 1300 includes a live-view display area 1301, a guide display area 1302, a guide display area 1303, an operation area 1305, and the exit button 1309.

The live-view display area 1301 is an area for displaying a live view image. The live-view display area 1301 includes a left-side display area 1301A and a right-side display area 1301B. The guide display area 1302 is an area for displaying character strings indicating which one of the two optical systems (the left-eye optical system 301L and the right-eye optical system 301R) of dual lenses displays an image in the left-side display area 1301A. The guide display area 1303 is an area for displaying character strings indicating which one of the two optical systems (the left-eye optical system 301L and the right-eye optical system 301R) of dual lenses displays an image in the right-side display area 1301B. The operation area 1305 is an area for receiving an operation for PC live view. The operation area 1305 displays the radio button 1306, a radio button 1307, and the check box 1308. The radio button 1306 is a radio button selected when circular fish-eye display is provided. The radio button 1307 is a radio button selected when equidistant cylinder display is provided. When the radio button 1306 is selected, the radio button 1307 is not selected. When the radio button 1306 is not selected, the radio button 1307 is selected. The check box 1308 is a box to be checked when the positions of left and right images are exchanged. When the check box 1308 is operated, the positions of a right image (right-eye video) and a left image (left-eye video) in a live view image are exchanged while the character strings displayed in the guide display areas 1302 and 1303 are also exchanged with each other. The exit button 1309 is a button for terminating PC live view.

In FIG. 13A, the radio button 1306 for providing circular fish-eye display is selected. The check box 1308 for exchanging the positions of left and right images is not checked. Thus, a live view image obtained from the camera is displayed as it is in the live-view display area 1301. Specifically, right-eye video is displayed as a circular fish-eye image in the left-side display area 1301A while left-eye video is displayed as a circular fish-eye image in the right-side display area 1301B. Moreover, a magic window 1304A is superimposed on the right-eye video displayed in the left-side display area 1301A while a magic window 1304B is superimposed on the left-eye video displayed in the right-side display area 1301B. The magic window 1304A superimposed on the right video indicates a part to be displayed during playback display (dual-lens VR display) in the angle of view of the right-eye optical system 301R. The magic window 1304B superimposed on the right video indicates a part to be displayed during playback display (dual-lens VR display) in the angle of view of the left-eye optical system 301L.

Figure 13B:
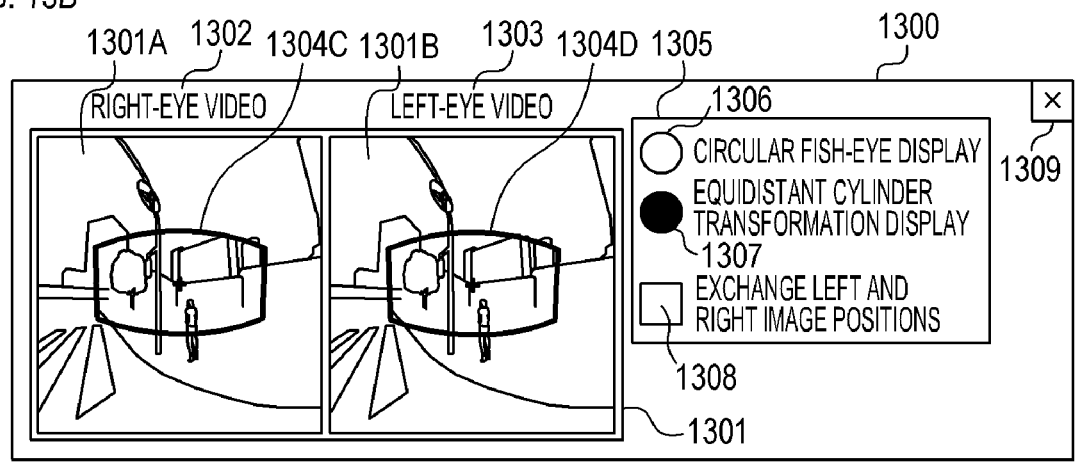

In FIG. 13B, the radio button 1307 for providing equidistant cylinder display is selected. The check box 1308 for exchanging the positions of left and right images is not checked. Thus, the right-eye video and the left-eye video (circular fish-eye images) in the live view image obtained from the camera are each transformed into an equidistant cylindrical image (the positions of the images are not exchanged). Thereafter, the live-view display area 1301 displays the live view image obtained after the transformation into an equidistant cylindrical image. Specifically, right-eye video is displayed as an equidistant cylindrical image in the left-side display area 1301A while left-eye video is displayed as an equidistant cylindrical image in the right-side display area 1301B. Moreover, a magic window 1304C is superimposed on the right-eye video displayed in the left-side display area 1301A while a magic window 1304D is superimposed on the left-eye video displayed in the right-side display area 1301B. The magic window 1304C superimposed on the right-eye video is obtained by performing an equidistant cylinder transforming to the magic window 1304A in FIG. 13A. The magic window 1304C has a different shape from the magic window 1304A. The magic window 1304C superimposed on the left-eye video is obtained by performing an equidistant cylinder transforming to the magic window 1304B in FIG. 13A. The magic window 1304C has a different shape from the magic window 1304B.

In FIG. 13C, the radio button 1306 for providing circular fish-eye display is selected, and the check box 1308 for exchanging the left and right images is checked. Thus, the positions of the right-eye video and the left-eye video in the live view image obtained from the camera are exchanged. Thereafter, the live-view display area 1301 displays the live view image obtained after the positions are exchanged. Specifically, left-eye video is displayed as a circular fish-eye image in the left-side display area 1301A while right-eye video is displayed as a circular fish-eye image in the right-side display area 1301B. Furthermore, the magic windows 1304A and 1304B illustrated in FIG. 13A are displayed. However, the positions of the magic windows 1304A and 1304B are also exchanged in response to the exchange of the positions of the right-eye video and the left-eye video.

In FIG. 13D, the radio button 1307 for providing equidistant cylinder display is selected, and the check box 1308 for exchanging the left and right images is checked. Thus, the positions of the right-eye video and the left-eye video in the live view image obtained from the camera are exchanged, and the right-eye video and the left-eye video (circular fish-eye images) are each transformed into an equidistant cylindrical image. Thereafter, the live-view display area 1301 displays the live view image obtained after the exchange of the left and right images and the transformation into an equidistant cylindrical image. Specifically, left-eye video is displayed as an equidistant cylindrical image in the left-side display area 1301A while right-eye video is displayed as an equidistant cylindrical image in the right-side display area 1301B. Furthermore, the magic windows 1304C and 1304D illustrated in FIG. 13B are displayed. However, the positions of the magic windows 1304C and 1304D are also exchanged in response to the exchange of the positions of the right-eye video and the left-eye video.

The various kinds of control to be performed by the system control unit 50 may be performed by a piece of hardware, or processing may be shared among pieces of hardware (e.g., a plurality of processors or circuits) to control the overall device. Likewise, the various kinds of control to be performed by the control unit 501 may be performed by a piece of hardware or processing may be shared among pieces of hardware (e.g., a plurality of processors or circuits) to control the overall device.

The present invention were specifically described in accordance with the preferred embodiments. The present invention is not limited to these specific embodiments. The present invention includes various modes without departing from the scope of the invention. Each of the foregoing embodiments merely illustrates an embodiment of the present invention, and the embodiments can be combined as necessary.

The present invention is not limited to a camera or a PC. The present invention is applicable to any electronic apparatuses capable of handling VR images. For example, the present invention is applicable to a PDA, a mobile-phone unit or a portable image viewer, a printer, a digital photo frame, a music player, a video game machine, and an electronic book reader. The present invention is further applicable to, for example, a video player, a display device (including a projector), a tablet, a smartphone, an AI speaker, a home electrical appliance, and an on-board unit.

According to the present disclosure, a range to be displayed during playback display can be identified during live view display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-091093, filed on May 31, 2021, which is hereby incorporated by reference herein in its entirety.

What is claimed is:

1. An electronic apparatus comprising:
a processor; and a memory storing a program which, when executed by the processor, causes the electronic apparatus to
obtain a first live view image corresponding to a first optical image inputted via a first optical system, and a second live view image corresponding to a second optical image inputted via a second optical system having a predetermined parallax with respect to the first optical system, and
perform control to display the first live view image and the second live view image side by side and superimpose an indicator indicating a position corresponding to a part to be displayed on a screen of an external display device first on each of the first live view image and the second live view image.

2. The electronic apparatus according to claim 1, wherein the first live view image is obtained by image-shooting and control is performed to superimpose the indicator in an image-shooting standby state or during image-shooting.

3. The electronic apparatus according to claim 1, wherein control is performed to superimpose the indicator in a specific display mode, and the control for superimposing the indicator is not performed in a display mode different from the specific display mode.

4. The electronic apparatus according to claim 1, wherein the first optical system is a fish-eye lens, and
the first live view image is a circular fish-eye image.

5. The electronic apparatus according to claim 1, wherein the first optical image is a circular fisheye image and the first live view image is a circular fish-eye image or an equidistant cylindrical image into which the first optical image is transformed.

6. The electronic apparatus according to claim 5, wherein in a case where the first live view image is the equidistant cylindrical image, the first live view image is a lower resolution than a case where the first live view image is the circular fish-eye image.

7. The electronic apparatus according to claim 5, wherein in a case where the first live view image is the equidistant cylindrical image, control is performed to superimpose the indicator that has been subjected to the transformation.

8. The electronic apparatus according to claim 1, wherein in a case where the first live view image is enlarged and displayed, control for superimposing the indicator is not performed.

9. The electronic apparatus according to claim 1, wherein the electronic apparatus is an imaging apparatus for capturing the first optical image.

10. The electronic apparatus according to claim 9, wherein the first live view image is displayed on a display unit of the electronic device and the indicator is superimposed on a fixed position on the display unit.

11. The electronic apparatus according to claim 10, wherein the fixed position is a central part of the first live view image.

12. The electronic apparatus according to claim 1, wherein the electronic apparatus is an information processing apparatus connectable to an imaging apparatus for capturing the first optical image.

13. The electronic apparatus according to claim 12, wherein the first live view image is displayed on a display unit of another electronic apparatus connected to the electronic device and the indicator is superimposed on a position based on information related to the first optical system on the display unit.

14. The electronic apparatus according to claim 1, wherein the first optical image is a circular fisheye image and a part of the first optical image is converted into a perspective projection format and the converted part of the first optical image is displayed on the screen of the external display device.

15. The electronic apparatus according to claim 1, wherein control is performed to superimpose the indicator when the first optical system is a fisheye lens unit and control is not performed to superimpose the indicator when the first optical system is not a fisheye lens unit.

16. A control method of an electronic apparatus, comprising:
- obtaining a first live view image corresponding to a first optical image inputted via a first optical system, and a second live view image corresponding to a second optical image inputted via a second optical system having a predetermined parallax with respect to the first optical system, and
- performing control to display the first live view image and the second live view image side by side and superimpose an indicator indicating a position corresponding to a part to be displayed on a screen of an external display device first on each of the first live view image and the second live view image.

17. A non-transitory computer readable medium that stores a program, wherein the program causes a computer to execute a control method of an electronic apparatus, the control method comprising:
- obtaining a first live view image corresponding to a first optical image inputted via a first optical system, and a second live view image corresponding to a second optical image inputted via a second optical system having a predetermined parallax with respect to the first optical system, and
- performing control to display the first live view image and the second live view image side by side and superimpose an indicator indicating a position corresponding to a part to be displayed on a screen of an external display device first on each of the first live view image and the second live view image.

\* \* \* \* \*